United States Patent [19]

Ikeda et al.

[11] Patent Number: 5,495,458
[45] Date of Patent: Feb. 27, 1996

[54] OPTICAL DISK APPARATUS FOR DETECTING ERROR READINGS OF A TRACK ADDRESS IN MCAV FORMAT

[75] Inventors: Toru Ikeda; Shigenori Yanagi; Akira Minami, all of Kawasaki, Japan

[73] Assignee: Fujitsu Limited, Kawasaki, Japan

[21] Appl. No.: 276,863

[22] Filed: Jul. 6, 1994

[30] Foreign Application Priority Data

Nov. 11, 1993 [JP] Japan .................................. 5-282345

[51] Int. Cl.⁶ .................................................. G11B 17/22
[52] U.S. Cl. ............................................... 369/32; 369/58
[58] Field of Search ............................... 369/32, 47, 48, 369/54, 58, 44.28, 44.32, 44.33, 275.3, 13

[56] References Cited

U.S. PATENT DOCUMENTS

| | | | |
|---|---|---|---|
| 4,873,679 | 10/1989 | Murai et al. | 369/32 |
| 5,138,599 | 8/1992 | Fukushima et al. | 369/32 |
| 5,182,741 | 1/1993 | Maeda et al. | 369/58 |
| 5,245,595 | 9/1993 | Yasukawa | 369/32 |
| 5,278,814 | 1/1994 | Deguchi et al. | 369/47 |
| 5,315,568 | 5/1994 | Dente et al. | 369/32 |

FOREIGN PATENT DOCUMENTS

| | | |
|---|---|---|
| 59-79440 | 5/1984 | Japan . |
| 62-80865 | 4/1987 | Japan . |
| 63-43385 | 2/1988 | Japan . |
| 3-17840 | 1/1991 | Japan . |
| 3-40221 | 2/1991 | Japan . |
| 3-69030 | 3/1991 | Japan . |
| 4177669 | 6/1992 | Japan . |
| 4186562 | 7/1992 | Japan . |
| 4232660 | 8/1992 | Japan . |
| 4302831 | 10/1992 | Japan . |
| 4324131 | 11/1992 | Japan . |

*Primary Examiner*—Georgia Y. Epps
*Assistant Examiner*—Tan Dinh
*Attorney, Agent, or Firm*—Greer, Burns & Crain, Ltd.

[57] ABSTRACT

A recovery is promptly executed for a reading error of a track address in a modified constant angular velocity format. Upon seeking, when a defective reading operation of the track address occurs, a clock frequency of the zone corresponding to each detecting position is selected due to the detection of the head by a head position sensor or the movement of the head to a home position at which a detection signal of a home position sensor is obtained, and the reading operation is retried. Errors due to back talk noises upon reproduction are reduced. At the time of retry for the occurrence of errors due to the back talk noises, a modulation amount of a read beam from a laser diode is changed.

22 Claims, 23 Drawing Sheets

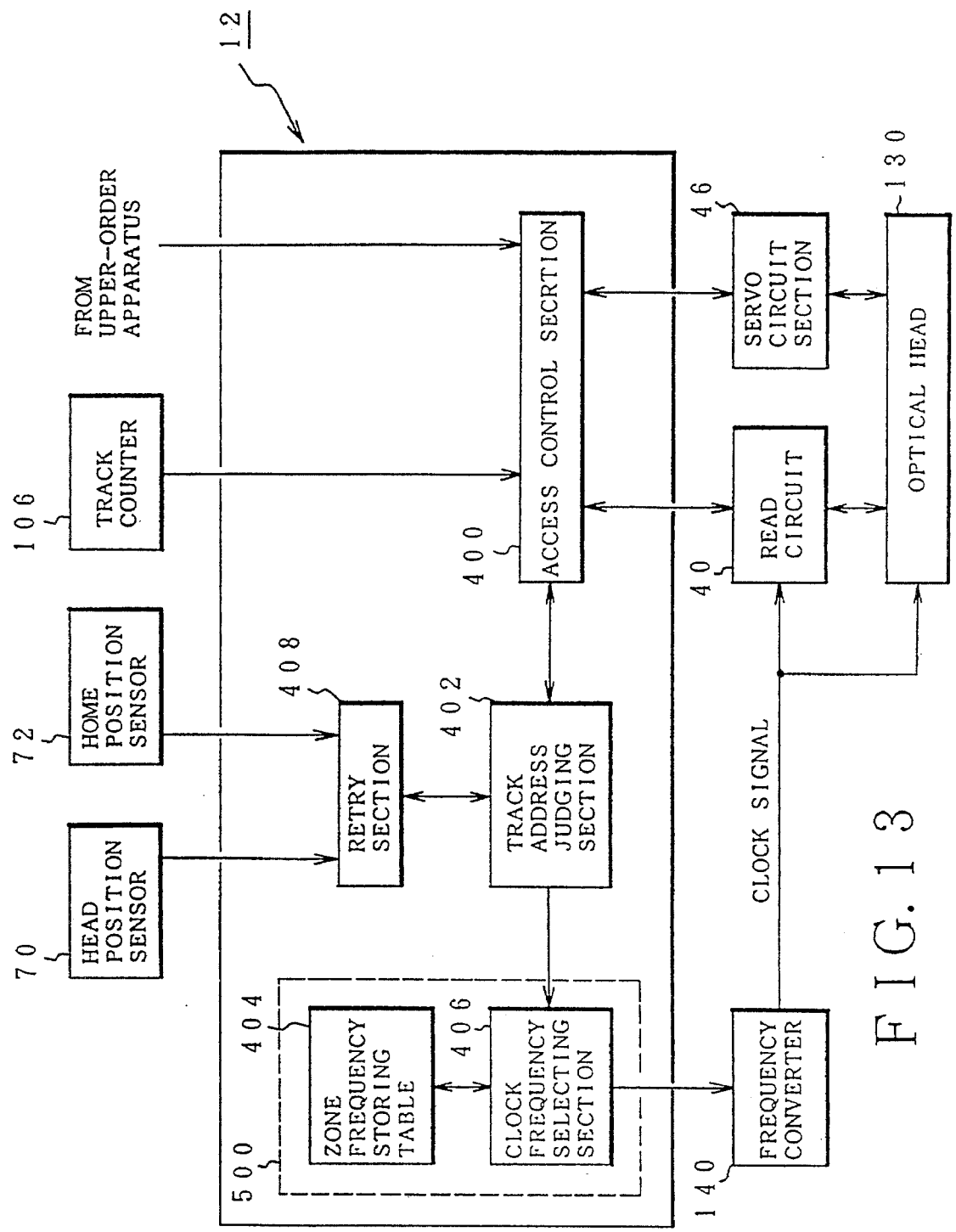
F I G. 1 3

OPTICAL DISK APPARATUS FOR DETECTING ERROR READINGS OF A TRACK ADDRESS IN MCAV FORMAT

BACKGROUND OF THE INVENTION

The present invention relates to an optical disk apparatus which executes a formatting to set a sector region in the circumferential direction of a track to a predetermined length and executes reading and writing operations of data by using a peculiar clock frequency every track zone in which the number of sectors in the circumferential direction is equal and, more particularly, to an optical disk apparatus which modulates a read beam in order to suppress a back talk in a read optical system.

In a recording medium of the conventional optical disk apparatus, a constant angular velocity (CAV) format is used. In the CAV format, as shown in FIG. 1, a recording region of an optical disk medium 130 is divided into radial sector regions 354 and physical sector lengths on the inner rim side and outer rim side are different. In such a CAV format, when the optical disk medium 130 is rotated at a constant rotational speed, all of the angular velocities of one sector are constant. Therefore, the reading and writing operations can be executed by a clock of a single frequency. As a result, the physical length on the inner rim side is shorter than that on the outer rim side for the same data amount and a data density in the circumferential direction on the inner rim side is higher than that on the outer rim side.

On the other hand, as a format which increases a memory capacity of the recording medium in the optical disk apparatus, a modified constant angular velocity (MCAV) format has been proposed. In the MCAV format, as shown in FIG. 2, the physical lengths of one sector in the circumferential direction of the track are almost equal. According to the MCAV format, since the sector lengths in the circumferential direction are set to be constant, the number of sectors per track decreases step by step from the outer rim toward the inner rim. Therefore, by collecting the tracks each having the same number of sectors, one zone 356 is formed. Due to this, the number of sectors per track is different depending on each zone. In the case where the optical disk medium of the MCAV format is rotated at a constant rotational speed, in the tracks which belong to the same zone, the angular velocity of one sector is constant. However, between zones, the angular velocity increases from the inner rim toward the outer rim. Therefore, the clock frequency is changed every different zone in the radial direction, thereby setting the densities in the circumferential direction on the inner rim and outer rim to be almost constant. That is, as a clock frequency which is used in the reading and writing operations, the clock frequency such that it becomes higher every .zone from the inner rim to the outer rim is set. The clock frequency is switched in accordance with the zone.

When a read request or a write request from a host computer is received, such an optical disk apparatus executes a seek control for positioning an optical head to a target track on the optical disk medium. At a time of the seek control, the optical disk apparatus which uses the MCAV format sets the clock frequency of the zone corresponding to a track address which is recognized at present and reads the track address. If the track address can be read, the seeking operation is started. If the reading of the track address fails, a retry to switch the clock frequency to the clock frequency of the adjacent zone and to read again is executed. The clock frequency is switched every zone and the track address is read again until the track address can be correctly read.

Flowcharts in FIGS. 3 and 4 show conventional seeking operations. First, in step S1 in FIG. 3, a seeking command from an upper apparatus is received. In step S2, the clock frequency of the zone corresponding to the present track address which is recognized on the basis of a track counter is set into a frequency converter and the track address is read. If the track address can be read in step S3, the processing routine advances to step S12 in FIG. 4 and the number of tracks from the present track address to the target track address is obtained. In step S13, the seeking operation is executed. According to the seeking operation, the number of tracks until the target track is subtracted by "1" every time a track crossing pulse is obtained and the number of remaining tracks is obtained. When the number of the remaining tracks is equal to zero, the arrival at the target track is detected and the control mode is switched from the seek control to a position control(fine control) to allow the light beam to trace the target track. When the seeking operation is completed, the clock frequency of the zone which includes the target track address is selected and the track address is read in step S14. If the track address can be read, the seeking operation is finished as a normality and is shifted to the reading or writing operation.

On the other hand, in step S3 in FIG. 3, in the case where the head position has been deviated into a different zone at the start time of the seeking, even the clock frequency of the zone which is recognized at present is set, the track address cannot be read. In this case, a retry counter NO is counted up by "1" and the reading operation of the track address by the same clock frequency is repeated until the number of reading operations reaches a predetermined number of retry times A in step S3. When the retry operation fails, the clock frequency is switched and changed by changing the zone one by one. Namely, the clock frequency of a zone Z which is obtained by adding "1" to the present zone is set into the frequency converter and the track address is read in step S6. If the track address cannot be read, the retry such that the same clock frequency is switched to another clock frequency by increasing the zone number Z by "1" and the reading operation is again executed is repeated until a retry counter N1 reaches the number of retry times A in steps S7 to S10. When the track address can be correctly read during the retry operations in step S7, the processing routine advances to the seeking operation in FIG. 4. In the case where the track address cannot be read even the clock frequencies of all of the zones are switched, the processing routine is finished as an abnormality. On the other hand, in the case where a defective reading operation of the track address occurs in the read check in step S15 after the seeking operation was completed by the setting of the clock frequency after completion of the seeking operation as shown in steps S12 to S14 in FIG. 4, the same retry process as those in steps S3 to S11 before the seeking operation is repeated in steps S14 to S23.

In the case where the retry process is executed due to the defective reading operation of the track address, when the head stays accidentally in the same zone because of the seeking failure, the track address can be read by the rereading process. When the head jumps to a different zone, however, the reading operation is executed by the retry process while switching the clock frequency and there are problems such that the retry process takes time and the performance deteriorates.

On the other hand, in the optical disk apparatus, in the case where the data recorded on the optical disk medium is reproduced, an error occurs due to a defect on the medium or the like. Therefore, an error correction code ECC is added to the recorded data and by using the error correction code ECC, the error is corrected by an error correction circuit and an error rate of about $10^{-12}$ is accomplished. However, since there are various factors to generate errors, there is a case such that the error cannot be corrected by only the error correction code ECC. As one of the factors of the error occurrence, a back talk as a peculiar phenomenon of the optical disk can be mentioned. This is a phenomenon such that in a light emission control of a laser diode which is used for recording and reproduction, a secondary resonator is constructed between the surface of the optical disk medium and the laser diode and noises are generated. As a method to suppress such back talk noises, a method such that the light from the laser diode is modulated by a high frequency to thereby obtain a modulation light, and when the return light due to the back talk is generated, a light emission amount is reduced, thereby decreasing the secondary resonance amount. Since a modulation depth of the laser diode reduces the life, however, the modulation depth cannot be set to a deep value, so that it is difficult to suppress the back talk completely. Since the generation amount of the back talk changes due to the conditions such as an environmental temperature and the like, there is a problem such that it is difficult to determine the proper modulation amount.

SUMMARY OF THE INVENTION

According to the invention, an optical disk apparatus in which a correct clock frequency can be set in a short time and an error can be recovered by a retry in the case where a defective reading operation of track address occurs is provided. First, the optical disk apparatus of the invention uses an optical disk medium which was subjected to an MCAV formatting in a manner such that each track in the circumferential direction from/onto which data can be read and written optically is divided into unit data storage regions each having a constant length in the circumferential direction is used. That is, in the optical disk medium, a plurality of tracks in the circumferential direction from/onto which data can be read and written optically are provided in the radial direction and the plurality of tracks are divided into a plurality of zones in the radial direction and the reading and writing operations are executed by using clock signals of frequencies which are different every zone. The optical head optically reads or writes data by irradiating a light beam onto a track of the optical disk medium. The beam position of the optical head for the optical disk medium is controlled by a servo section. A clock generating section generates a clock signal which is used for the reading and writing operations of the optical disk medium and can change the frequency of the clock signal by setting the frequency information from the outside. An accessing section recognizes a track address as a present beam irradiating position from a track passing (track crossing pulse) which is obtained in association with the movement of the optical head. When a seeking command from the upper apparatus is received, the optical head is moved to the target track position on the optical disk medium and, after that, data is read and written by using the clock signal from the clock generating section. A frequency setting section changes the frequency of the clock signal of the clock generating section to a frequency according to the zone of the target track. The frequency setting section has: a frequency information storing table in which predetermined clock frequency information that is different every zone has been stored; and, a frequency selecting section for selecting clock frequency information in the corresponding zone in the frequency information storing table on the basis of address information of the present track in the accessing section and for setting the selected clock frequency information to the clock generating section.

As for the optical disk apparatus using such an MCAV format, the invention has a retry section which is constructed in a manner such that when a defective reading operation of the track address occurs in a track address judging section, if a detection signal of a head position detecting section is judged, the track address is again read by using the clock signal of a zone frequency corresponding to the track address. The retry section repeats the re-reading operation in which the clock frequency in the zone which is obtained by changing the present detection zone one by one in the inner rim direction and the clock frequency in the zone which is obtained by changing the present detection zone one by one in the outer rim direction have alternately been set until the track address is read. Further, the track address judging section detects the track address of the target track from the read signal of the optical head when the seeking operation of the accessing section has been completed. When the detected track address coincides with the present track address which is recognized by the accessing section, the seeking operation is finished as a normality. At the time of completion of the seeking operation as well, when the defective reading operation of the track address is judged by the track address judging section, the retry section judges the zone from the detection signal of the head position detecting section and allows the track address to be again read by using the clock signal of the corresponding frequency. Also at this time, the retry section repeats the re-reading operation in which the clock frequency in the zone obtained by changing the present detection zone one by one in the inner rim direction and the clock frequency in the zone obtained by changing the present detection zone one by one in the outer rim direction have alternately been set until the track address is read. Further, the retry section repeats the reading operation using the same clock frequency until the defective reading operation of the track address using the clock frequency which was once selected reaches a predetermined number of retry times.

As a modification of the optical disk apparatus of the present invention which uses the MCAV formatting, a home position detecting section to detect a fixedly predetermined home position (initialization position) of the optical head is used in place of the head position detecting section. In this case, when the defective reading operation of the track address occurs in the track address judging section, the retry section forcedly moves the optical head to the home position by the accessing section. When the detection signal of the home position detecting section is obtained, the track address is again read by using the clock signal of the zone frequency corresponding to the track address at the home position. In this case, when the seeking operation by the accessing means is completed, the track address judging section also detects the track address of the target track from the read signal of the optical head, and when the detected track address coincides with the track address which is recognized at present, the seeking operation is finished as a normality. On the other hand, in the case where the defective reading operation of the track address is judged by the track address judging section, the optical head is moved to the home position by the accessing section in a similar manner. When the home position detection signal is obtained, the track address is read again by using the clock signal of the zone frequency corresponding to the track address at the home position.

According to the optical disk apparatus of the invention using the MCAV formatting of the invention, when the track address cannot be read, by switching the frequency to the clock frequency of the zone which is judged from the position detection signal by the head position sensor, the zone is recognized from the detection information of the physical track position and the correct clock frequency can be decided. When the track address cannot be read even by the retry operation based on the head position detection signal, the clock frequency is switched by increasing the zone one by one in each of the front and back directions and the track address is again read. Accordingly, the correct zone is rapidly retrieved so that the track address can be read. Further, the home position sensor is used in place of the head position sensor. When the track address cannot be read, the head is forcedly positioned to the home position and the clock frequency is initialized. After that, the seeking operation to the target track is executed and the recovery can be certainly performed. Therefore, the retry processing time when the address cannot be read can be reduced and the substantial performance can be improved.

According to the invention, the optical disk apparatus which can correctly read the track address by properly controlling the modulation amount of the laser beam for the occurrence of an error due to a back talk is provided. The power of the reproduction laser beam of the laser diode is controlled to a specified value by a light emission control section. Further, the laser reproduction beam is high frequency modulated by the modulating section. When an error exceeding the error correction ability occurs at the time of data reproduction, the control section changes the modulation amount of the modulating section and the retry operation of the data reproduction is performed. The control section allows the retry operation of the data reproduction to be executed by increasing the modulation amount when the error occurs. In this case, it is also possible to increase the modulation amount exceeding 100%. The control section doesn't modulate by setting the modulation amount to zero at the normal time when the data is being normally reproduced but increases the modulation amount when the error occurs, thereby allowing the retry operation to be executed. The control section can also decrease the modulation amount when the error occurs and allows the retry operation of the data reproduction to be executed. In this case, at the time of normality when the data is normally reproduced, the influence which is exerted on the life of the laser diode is modulated by a low modulation amount and the retry operation is executed by reducing the modulation amount when the error occurs.

The control section sets an adjusting mode when the apparatus is activated. In the adjusting mode, drive data at a light emission start point is obtained by sequentially increasing a drive current for the laser light emitting section and drive data at an operation point when a specified reproduction power is obtained is collected and the modulation amount of the modulating section is changed on the basis of the collected data. The modulating section modulates by alternately adding or subtracting the modulation current of the magnitude corresponding to the modulation amount to/from the specified drive current which is allowed to flow in the laser diode by the light emission control section by the switching due to the high frequency signal.

According to the optical disk apparatus of the invention, consequently, the modulation amount is set to a relatively small amount or zero in the ordinary state from a viewpoint of the life of the laser diode, and in the case where a back talk is generated in dependence on an environmental temperature, the kind of medium, or the like and an error exceeding the correction ability by the error correction code ECC occurs, the reading operation is retried by changing the modulation amount. At the time of the retry, the modulation amount is increased or decreased. By changing the modulation amount as mentioned above, the back talk noises decrease and the occurrence of error is suppressed.

The above and other objects, features, and advantages of the present invention will become more apparent from the following detailed description with reference to the drawings.

BRIEF DESCRIPTION OF THE DRAWINGS

FIG. 13 is an explanatory diagram of a switching function of a clock frequency corresponding to the MCAV format;

DETAILED DESCRIPTION OF THE PREFERRED EMBODIMENTS

[Hardware construction]

Figure 5:
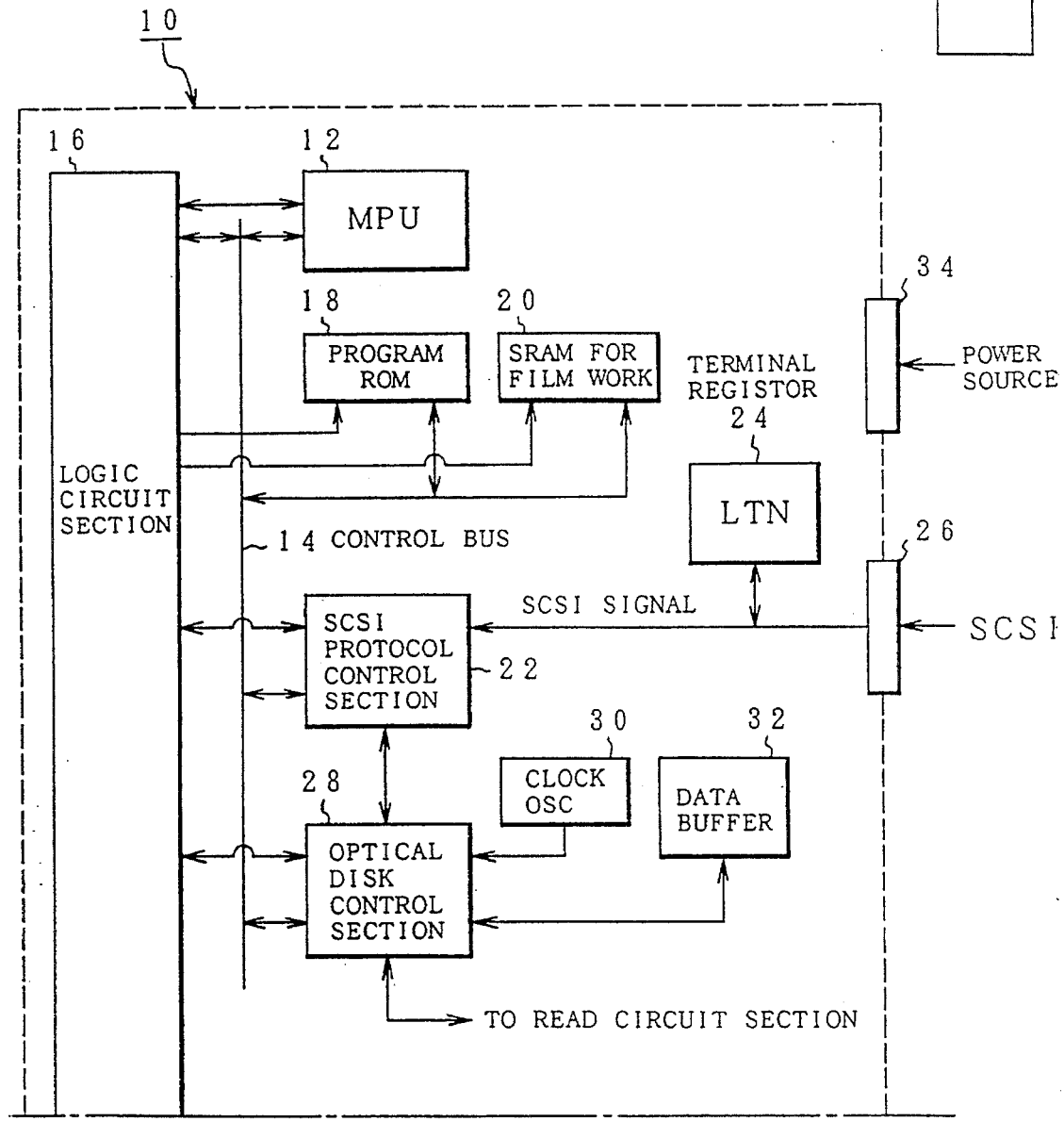
FIG. 5 is a block diagram of a hardware construction of the invention.

In FIG. 5, an MPU 12 is provided in a disk unit 10. A logic circuit section 16 to mainly perform the transmission and reception of data with other circuit sections is provided for the MPU 12. The logic circuit section 16 is divided and shown in FIGS. 6 and 7. A control bus 14 is provided for the MPU 12, thereby transmitting and receiving control information with other circuit sections. A program ROM 18 and an SRAM 20 for firm work are also provided for the MPU 12. The program ROM 18 and the SRAM 20 for firm work are subjected to a memory control from the MPU 12 through the control bus 14 and data is transferred to other circuit sections including the MPU 12 through the logic circuit section 16. A small computer system interface (SCSI) protocol control section 22 is provided for a data transfer between the disk unit 10 and an upper apparatus. The SCSI protocol control section 22 is connected to an SCSI of an upper apparatus by an SCSI connector 26. A terminal resistor 24 is branch connected to the SCSI connector 26 and a transmission impedance is matched. An optical disk control section 28 to decode a command from the upper apparatus and to execute the reading or writing operation or the like is provided for the SCSI protocol control section 22. For the optical disk control section 28, a clock oscillator 30 to generate a basic clock and a data buffer 32 to temporarily hold the transfer data are provided. Write data from the upper apparatus is stored into the data buffer 32 from the SCSI protocol control section 22 through the logic circuit section under the control of the optical disk control section 28. The data stored in the data buffer 32 is read out when the optical disk medium enters a writable state and the data is sent to a laser beam control section 36 in FIG. 6 through the logic circuit section 16 and a light emission control of the write beam is executed. The read data which was read out from the optical disk medium is stored into the data buffer 32 through the optical disk control section 28 and, after that, the data is read out by an establishment of the interface coupling with the upper apparatus by the SCSI protocol control section 22 and is transferred to the upper apparatus.

Figure 6:
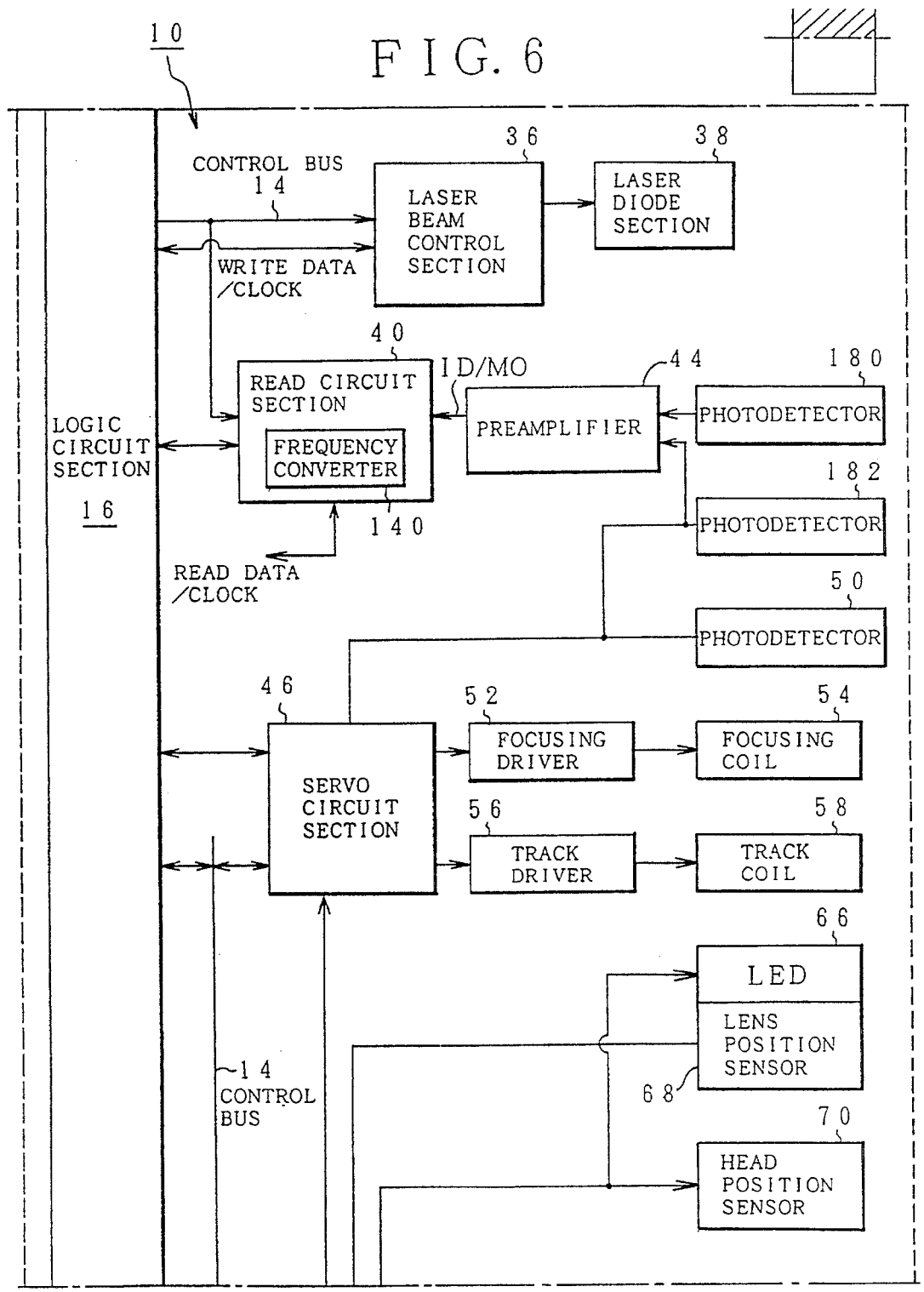
FIG. 6 is a (continuous) block diagram of the hardware construction of the invention.

In FIG. 6, the laser beam control section 36 executes the light emission control of a laser diode provided in a laser diode section 38. In the embodiment, three laser beams comprising a write beam, an erase beam, and a read beam are independently generated. Therefore, a laser diode for writing, a laser diode for erasing, and a laser diode for reading are provided in the laser diode section 38. In order to prevent an interference due to the three laser beams, a wavelength of the laser diode for reading is made different from wavelengths of the laser beams for writing and erasing. The laser beam control section 36 executes a write light emission, an erase light emission or a read light emission of the laser diode section 38 on the basis of a control signal of writing, erasing, or reading from the control bus 14. With respect to the write light emission, the beams are arranged in accordance with the order of the erase beam, write beam, and read beam from the head in the track running direction so that three beams can be irradiated simultaneously and the erasing and writing operations and the reading operation for confirmation can be executed by one rotation. In a portion of the disk unit 10 in FIG. 6, a read circuit section 40 is provided. An MO signal and an ID signal from a preamplifier 44 are input to the read circuit section 40. The preamplifier 44 generates the MO signal and the ID signal on the basis of detection signals of a photodetector (1-divided detector) 180 for reproduction and a photodetector (2-divided detector) 182 for tracking control. A frequency converter 140 is built in the read circuit section 40. The frequency converter 140 generates a read clock by frequency dividing the basic clock from the clock oscillator 30 in FIG. 5. The read clock is used to form read data from the MO signal of the preamplifier 44. Further, the read clock is also used as a write clock and a read clock in the laser beam control section 36. The frequency converter 140 of the read circuit section 40 is controlled so as to obtain the clock frequency of the zone in which the track address which is recognized by the MPU 12 at present is included since the optical disk medium of the invention uses the MCAV format.

The detection signals of the photodetector 182 for tracking control and a photodetector 50 for focusing control are input to a servo circuit section 46. The servo circuit section 46 is connected to a focusing coil 54 as a drive load through a focusing driver 52 and to a tracking coil 58 through a tracking driver 56. The focusing coil 54 and the tracking coil 58 are drive coils of a 2-dimensional rotary actuator of an objective lens provided for the optical head. That is, an automatic focusing control such that the objective lens is moved in the optical axis direction by driving the focusing coil 54 and a beam spot is formed onto the surface of the optical disk medium is executed. A fine control (tracking control) such that the objective lens is moved to a predetermined range in the radial direction of the optical disk medium by driving the tracking coil 58 and the laser beam is traced along the track central line is executed. As for an LED 66 and a lens position sensor 68, the position of a lens actuator which rotates by driving the tracking coil 58 is detected by the lens position sensor 68 by using the light from the LED 66. A head position sensor 70 uses a linear position sensor known as a PSD in which a sensor terminal current differs depending on the light irradiating position. According to the detection signal of the head position sensor 70, a physical absolute position at which the optical head exists can be recognized on the MPU 12 side.

Figure 7:
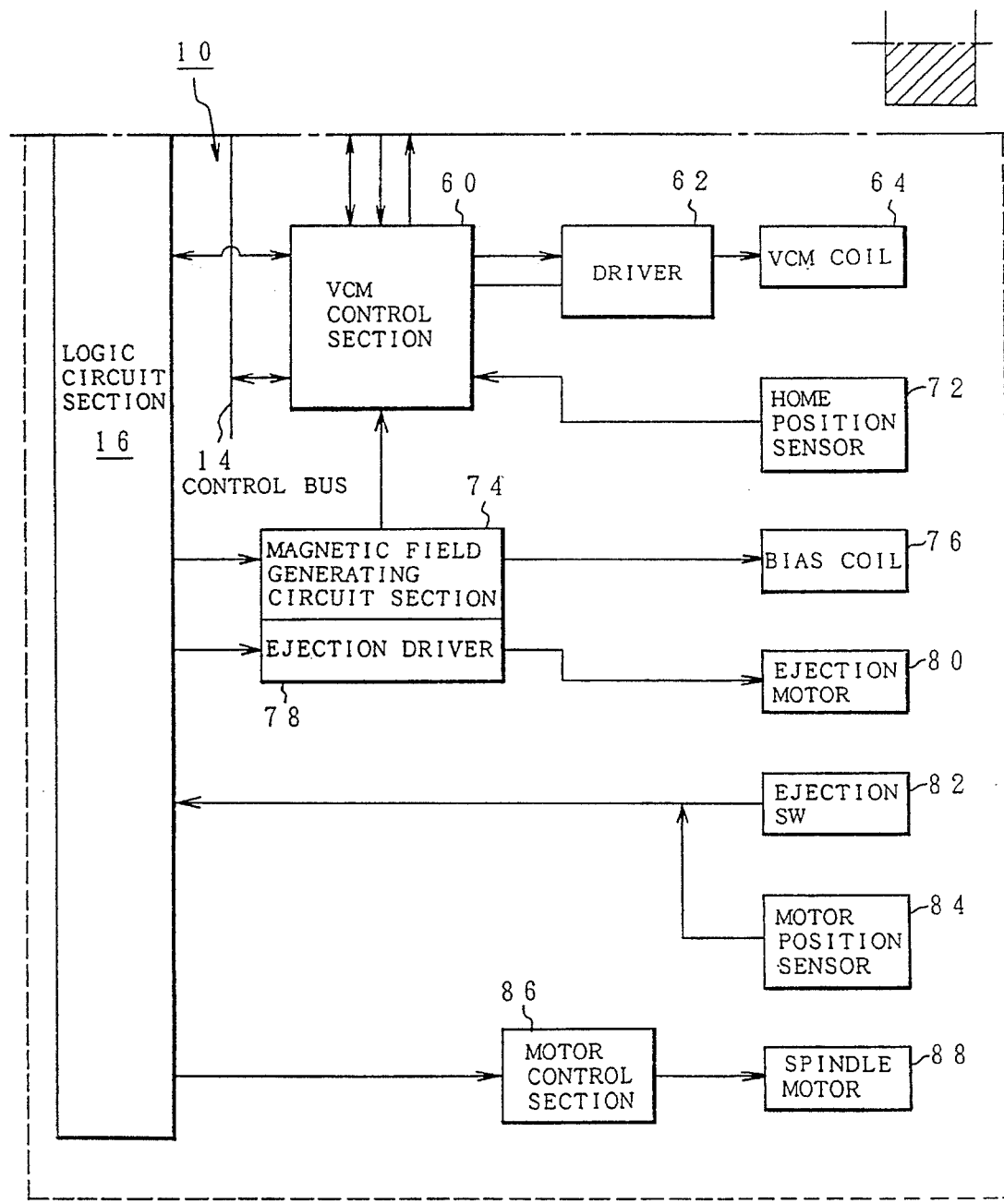
FIG. 7 is a (continuous) block diagram of the hardware construction of the invention.

In FIG. 7, a voice coil motor control section (hereinafter, referred to as a "VCM control section") 60 is connected to a VCM coil 64 as a driving coil of the voice coil motor through a driver 62 as a drive load. By the driving of the VCM coil 64, a movable portion of the optical head which is arranged so as to be movable in the radial direction of the optical disk medium can be moved. A home position sensor 72 is connected to the VCM control section 60. When the optical head is moved to the fixedly predetermined home position at the innermost rim of the optical disk medium, the home position sensor 72 optically detects the movement of the head and generates a detection signal. The home position of the optical head detected by the home position sensor 72 is the initialization position when the disk unit is activated by turning on the power source. Such a position is set to a reference and the subsequent accessing process is started.

A magnetic field generating circuit section 74 is connected to a bias coil 76. The bias coil 76 is a coil of an electromagnet which is provided near the erase beam irradiating position of the optical disk medium. A current is supplied to the bias coil 76 at the time of erasing and the bias coil 76 is used to erase in order to align the magnetizing direction of the optical disk medium to a predetermined direction. Since the disk unit of the embodiment enables the optical disk medium to be attached or detached, an ejection driver 78 drives an ejection motor 80 by the operation based on the ejecting operation by an operator and ejects the optical disk medium chucked to the spindle motor to the outside. Obviously, the optical disk medium which is enclosed in a cartridge casing is used in the invention. In correspondence to the ejection driver 78, an ejection switch 82 and a motor position sensor 84 are provided. When an operator operates the ejection switch 82, the ejection driver 78 drives the ejection motor 80 through the logic circuit section 16. In this instance, the motor is driven under the condition of the position detection by the position sensor 84. That is, when the motor position sensor 84 detects that the ejection motor 80 is located at the loading position, the ejection driver 78 drives the ejection motor 80 in response to the operation of the ejection switch 82 and ejects out the disk cartridge. A motor control section 86 rotates the optical disk medium at a constant speed by the driving of a spindle motor 88.

[Servo circuit system]

Figure 8:
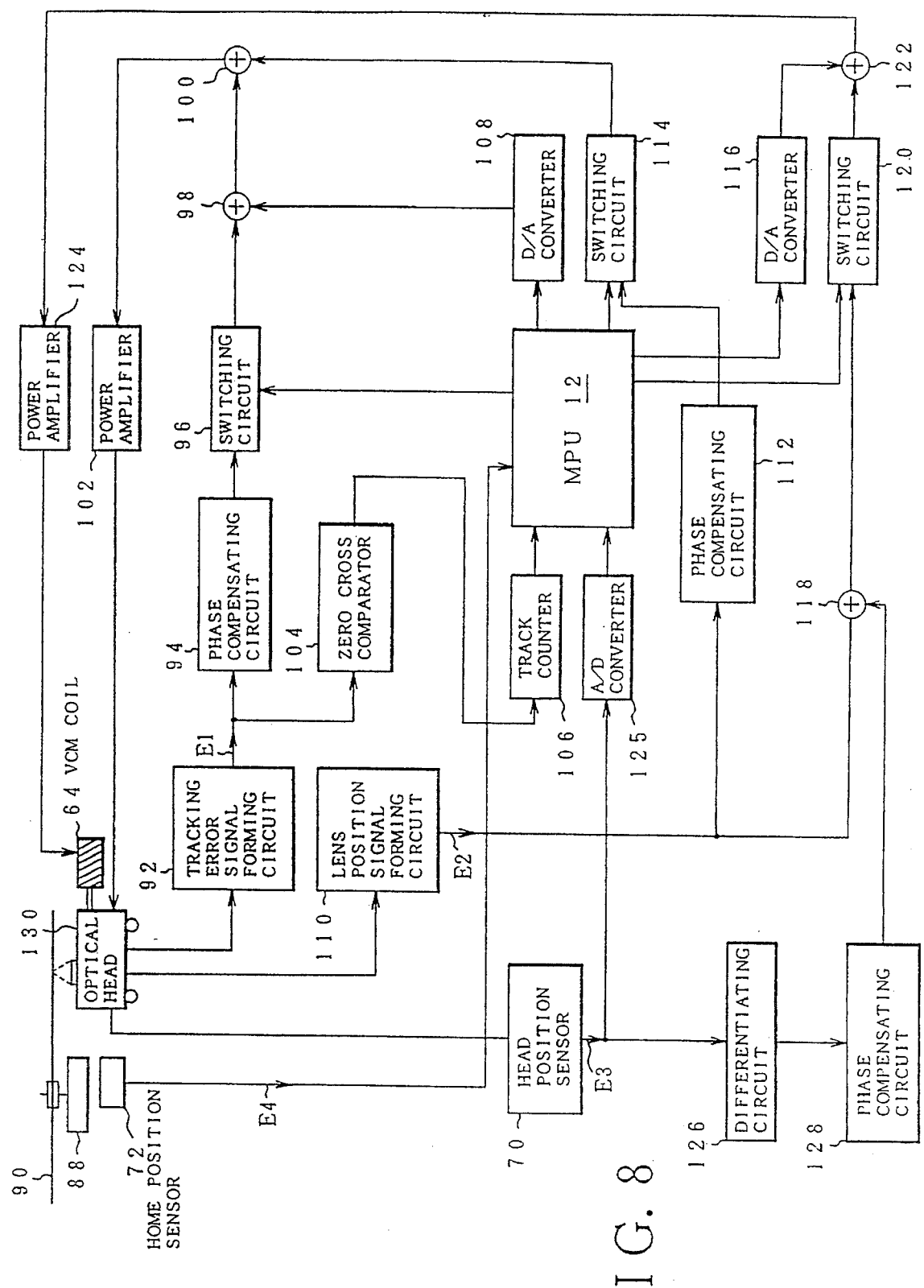
FIG. 8 is a block diagram of a servo circuit section of the invention.

FIG. 8 is a diagram showing the details of the servo circuit section 46 of the disk unit 10 shown in FIGS. 5 to 7. An optical disk medium 90 is rotated at a constant speed by the spindle motor 88. The optical head 130 is provided for the optical disk medium 90 so as to be movable in the radial direction. The optical head 130 is driven by the VCM coil 64. The optical head 130 has therein the photodetector 180 for reproduction, the photodetector 182 for tracking control, and the photodetector 50 for focusing control shown in FIG. 6. A tracking error signal forming circuit 92 receives the detection signal from the photodetector for tracking control and forms a tracking error signal E1. In the case where the optical head 130 moves in the radial direction of the optical disk medium 90, the tracking error signal E1 becomes a signal which is cycle changed every time the optical head 130 crosses the track. In the case where the tracking control of the beam from the optical head 130 is being executed, the tracking error signal E1 becomes a signal whose signal level linearly changes in accordance with a deviation amount of the beam from the track center. A zero cross point of the tracking error signal E1 in the seeking operation of the optical head 130 is detected by a zero cross comparator 104 and is given to a track counter 106. The track counter 106 counts the number of track passing times by counting the number of detection pulses from the zero cross comparator 104. Specifically speaking, the track counter 106 is reset to 0 at the detection position of the optical head 130 by the home position sensor 72, namely, at the initialization position. When the optical head 130 is moved from the home position of the home position sensor 72 to the outer rim side, the count value is increased by "1". When the head 130 is moved to the inner rim side, the count value is decreased by "1". The value of the track counter 106 indicates the number of tracks from the present home position.

The tracking error signal E1 from the tracking error signal forming circuit 92 during the tracking control is subjected to a compensation of a leading phase by a phase compensating circuit 94. After that, the tracking error signal E1 is supplied to a power amplifier 102 through a switching circuit 96 and addition points 98 and 100 and a tracking control of a lens actuator provided in the optical head 130 is executed by an output current from the power amplifier 102. Due to this, the switching circuit 96 is turned off by the MPU 12 at the time of the seek control and is turned on at the time of the track lead-in due to the completion of the seek control.

A detection signal from the lens position sensor 68 in FIG. 6 provided in the optical head 130 is supplied to a lens position signal forming circuit 110 and a lens position signal E2 is formed. The lens position signal E2 linearly changes to zero at the neutral position of the lens actuator, to the positive side when the lens actuator moves in one direction, and to the negative side when the lens actuator moves in the opposite direction. The lens position signal E2 of the lens position signal forming circuit 110 is subjected to the compensation of a leading phase by a phase compensating circuit 112. After that, the signal E2 is added to the addition point 100 through a switching circuit 114. The switching circuit 114 is turned on at the time of the seek control and is turned off at the time of the track lead-in by the MPU 12. Due to this, by turning on the switching circuit 114 at the time of the seek control, the lens position signal E2 from the phase compensating circuit 112 is added to the power amplifier 102 through the addition point 100, thereby driving the lens actuator of the optical head 130. Accordingly, a servo position control to hold the lens actuator at the neutral position so that the lens position signal E2 is always equal to 0 is performed.

A D/A converter 108 receives predetermined offset data by the MPU 12 at the time of the seek control and adds an offset signal from the addition point 98 to the lens position signal E2 at the addition point 100. Due to this, the lens actuator of the optical head 130 can be offset during the seeking operation as necessary. For example, while the optical head 130 is moving, in the case where the number of remaining tracks until the target track decreases to a predetermined value in the MPU 12, the offset data is given to the D/A converter 108 and the lens actuator is rotated to the target track side. Due to this, the beam is moved to the target track by the lens actuator simultaneously with the movement of the optical head 130, thereby enabling the track lead-in to be executed at a high speed.

The control of the VCM coil 64 which is driven by a power amplifier 124 can be realized by setting control data to a D/A converter 116 by the MPU 12. An output of the D/A converter 116 is given to the power amplifier 124 through an addition point 122. That is, the MPU 12 sets specified VCM coil driving data to the D/A converter 116 at the time of the seek control and the seeking operation by the movement of the optical head 130 is executed. For example, predetermined acceleration data is set to the D/A converter 116 when the seek control is started. Speed control data is set so that a specified target speed can be obtained after the acceleration. Deceleration data is set when the number of remaining tracks until the target track decreases to the specified value, thereby executing a deceleration control. During such a seek control, a head position signal E3 from the head position sensor 70 to detect the physical position of the optical head 130 is converted to digital data by an A/D converter 125 and is supplied to the MPU 12. The MPU 12 obtains the speed of the optical head 130 by the calculation of the head position signal converted by the A/D converter 125 and sets speed control data to the D/A converter 116 so that a predetermined target speed is maintained.

Further, the head position signal E3 from the head position sensor 70 is differentiated by a differentiating circuit 126 and is phase compensated by a phase compensating circuit 128. After that, the signal E3 is added to the addition point 122 through an addition point 118 and a switching circuit 120. The switching circuit 120 is controlled by the MPU 12 so as to be turned off at the time of the seek control and to be turned on at the time of the track lead-in. Therefore, when the switching circuit 120 is turned on at the time of the track lead-in, in this instance, the optical head 130 is in a deceleration control state. A differentiation component of the head position signal E3 in the deceleration control is fetched into a speed control loop of the optical head 130 by the VCM coil 64, thereby raising a stability in the track lead-in. Further, the lens position signal E2 from the lens position signal forming circuit 110 is added to the addition point 118. When the switching circuit 120 is turned on by the MPU 12 at the time of the track lead-in, by switching the on-track control (fine control) after completion of the lead-in, a servo position control to drive the VCM coil 64 so that the lens position signal E2 is equal to 0 is executed. That is, a double servo to control the position of the optical head 130 so as to hold the lens actuator at the neutral position is applied to the tracking control by the tracking error signal E1. The double servo operates in a manner such that when the lens actuator of the optical head 130 is moved from the neutral position to the track deviation direction in accordance with the tracking error signal E1, the position change of the lens actuator is detected by the lens position signal forming circuit 110, and the servo position control to position the optical head 130 by driving the VCM coil 64 so as to set the lens position signal E2 to 0 indicative of the neutral position is performed.

With respect to the servo circuit section in FIG. 8, the operations at the time of the seek control, at the time of the track lead-in and, further, at the time of the fine control after the completion of the track lead-in will be described hereinbelow, respectively. First, when a seeking command from the upper apparatus is received by the MPU 12, the address of the target track is recognized and the number of tracks from the present track address which is counted by the track counter 106 until the target track is calculated. Subsequently, the MPU 12 turns off the switching circuits 96 and 120 and simultaneously turns on the switching circuit 114. The MPU 12 sets specified acceleration data to the D/A converter 116. Therefore, an acceleration voltage is sent from the D/A converter 116 to the power amplifier 124 through the addition point 122 and an acceleration current is supplied to the VCM coil 64. Due to this, the optical head 130 starts to move in the direction of the target track by the driving of the VCM coil 64. The head position change by the movement of the optical head 130 is detected by the head position sensor 70. The head position signal E3 is supplied to the MPU 12 through the A/D converter 125. When the target speed is obtained, the control is switched from the acceleration control to the constant speed control. Speed control data is set to the D/A converter 116 so that the deviation from the target speed is equal to 0 during the constant speed control. In association with the movement of the optical head 130 during the seek control, the zero cross comparator 104 outputs the track crossing pulse on the basis of the tracking error signal E1 generated from the tracking signal forming circuit 92 and the track crossing pulse is counted by the track counter 106. The MPU 12 monitors the number of remaining tracks which is obtained by subtracting the count value of the track counter 106 from the number of tracks until the target track. When the number of remaining tracks decreases to a predetermined value, the MPU 12 sets deceleration data to the D/A converter 116. The deceleration voltage of an opposite polarity is generated from the D/A converter 116 to the power amplifier 124 through the addition point 112 and the deceleration control of the optical head 130 is executed by the deceleration driving of the VCM coil 64. In this instance, if necessary, it is also possible to construct in a manner such that offset data is set to the D/A converter 108 and the objective lens is forcedly offset in the target track direction by the driving of the lens actuator by the power amplifier 102 and the beam is led onto the target track a little early. It is obvious that the switching circuit 114 is ON during the seek control and the position control so as to hold the lens actuator provided in the optical head 130 at the neutral position is executed by the lens position signal E2. When it is judged that the number of remaining tracks until the target track is equal to 0 or a value just before 0, the MPU 12 turns off the switching circuit 114 and simultaneously turns on the switching circuits 96 and 120 and the track lead-in is performed. That is, by turning on the switching circuit 96, the tracking error signal E1 is supplied to the power amplifier 102 through the phase compensating circuit 94, switching circuit 96, and addition points 98 and 100. The tracking control to drive the lens actuator provided in the optical head 130 so as to position the beam to the center of the target track is performed. By turning on the switching circuit 120, the speed change at the time of the deceleration lead-in of the optical head 130 is fetched as a differentiation component of the head position signal E3, the hunting of the tracking actuator after completion of the track lead-in is suppressed, thereby executing a stable track lead-in. After the lead-in control to the target track was completed, the tracking control based on the tracking error signal E1 is executed. Simultaneously, when the lens actuator provided in the optical head 130 is moved by the tracking control, the lens position change is captured by the lens position signal E2 and the double servo by the position servo to return the lens actuator to the neutral position by the driving of the VCM coil 64 is performed. In a state of such a tracking control, the reading operation or the writing operation by the optical head 130 is executed.

[Switching of clock frequency according to zone]

Figure 9:
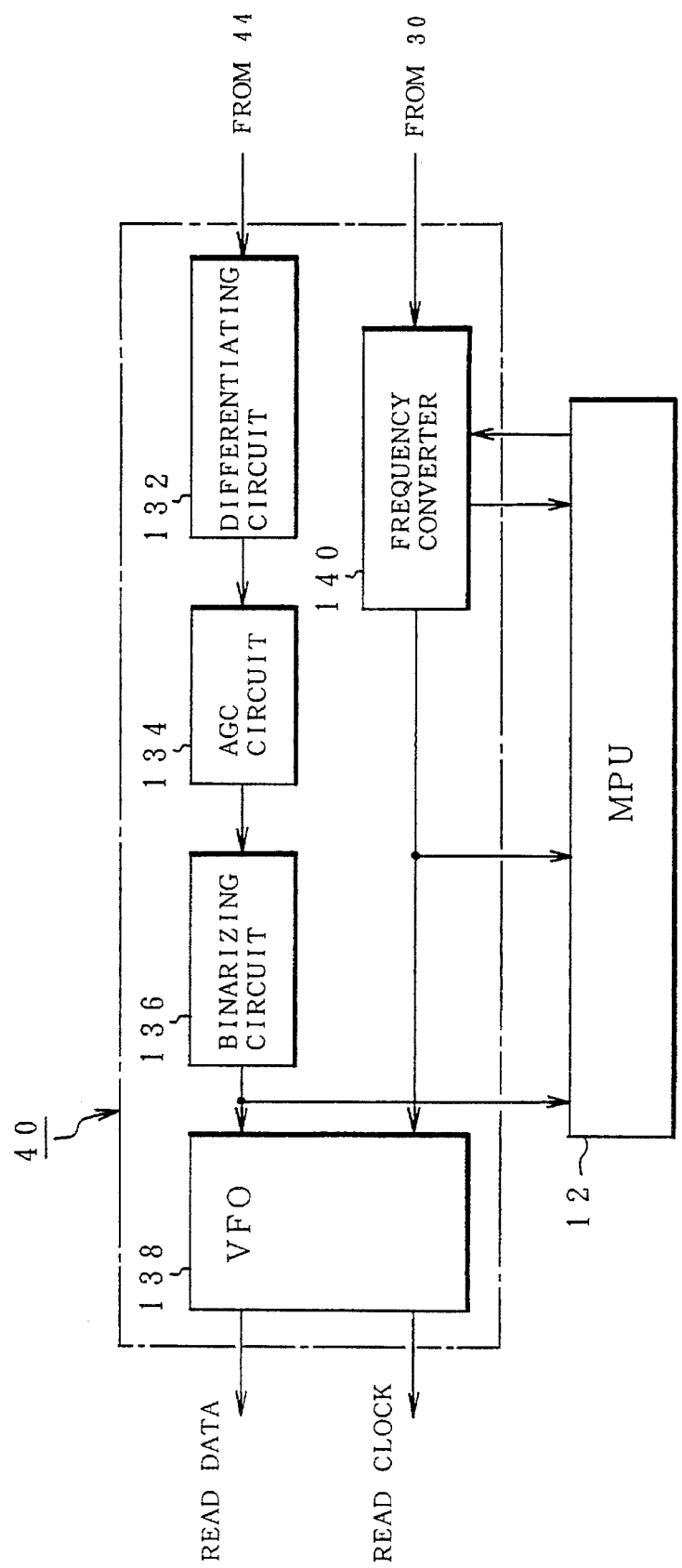
FIG. 9 is a block diagram of a read circuit section of the invention.

FIG. 9 is a diagram showing the details of the read circuit section 40 in FIG. 6. A differentiating circuit 132, an AGC circuit 134, a binarizing circuit 136, and a VFO 138 are provided in the read circuit section 40 in order to form read data from the analog read signal from the preamplifier 44. The frequency converter 140 is also provided to form read data synchronized with the read clock by the VFO 138. A clock pulse from the clock oscillator 30 in FIG. 5 is input to the frequency converter 140 as a reference clock. The frequency converter 140 supplies a clock signal of the frequency corresponding to a judgement zone of the MCAV format as a read clock to the VFO 138 under the control of the MPU 12.

Figure 10:
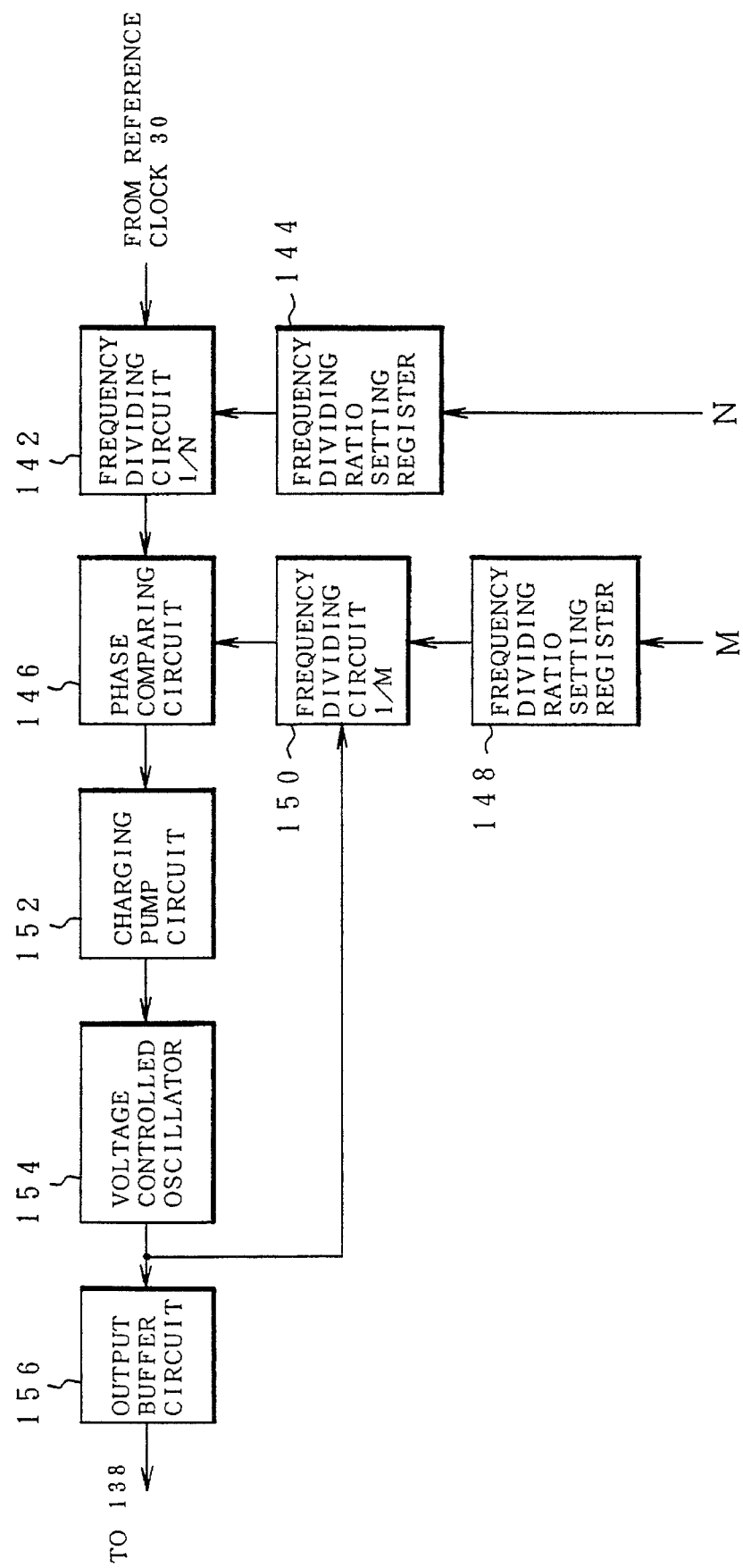
FIG. 10 is a block diagram of a clock generating circuit section of the invention.

FIG. 10 is a diagram showing the details of the frequency converter 140 in FIG. 9. As a frequency converter 140, for example, SSI32D4663 manufactured by the TDK can be used. The frequency converter 140 comprises a frequency dividing circuit 142, a frequency dividing ratio setting register 144, a phase comparing circuit 146, a frequency dividing circuit 150, a frequency dividing ratio setting register 148, a charging pump circuit 152, a voltage controlled oscillator 154, and an output buffer circuit 156 and constructs a circuit known as a PLL. A frequency division value (N) is set into the frequency dividing ratio setting register 144 by the MPU 12. On the basis of the frequency division value (N), the frequency dividing circuit 142 divides the reference clock from the clock oscillator 30 into 1/N. A frequency division value (M) is set into the frequency dividing ratio setting register 148 by the MPU 12. An oscillation signal from the voltage controlled oscillator 154 is frequency divided into 1/M by the frequency dividing circuit 150 and the divided signal is supplied to the phase comparing circuit 146. The phase comparing circuit 146 generates a signal corresponding to a phase difference of the frequency dividing pulse from the frequency dividing circuit 150 by using the frequency dividing clock from the frequency dividing circuit 142 as a reference signal. The charging pump circuit 152 generates a charging voltage corresponding to a phase output from the phase comparing circuit 146 and supplies to the voltage controlled oscillator 154. The voltage controlled oscillator 154 outputs a clock signal of the frequency corresponding to the voltage signal from the charging pump circuit 152. The output buffer circuit 156 outputs the clock signal by the voltage controlled oscillator 154 to the VFO 138 as a read clock. According to the frequency converter 140 shown in FIG. 10, the signal of a frequency which is (M/N) times as high as the fundamental frequency of the reference clock from the clock oscillator 30 can be generated. As frequency division values (M) and (N) for the frequency converter 140 by the MPU 12, the values in which a predetermined clock frequency is obtained are set on the basis of the zone to which the track as a read target in the MCAV format belongs.

[Structure of the optical head and optical system]

Figure 11:
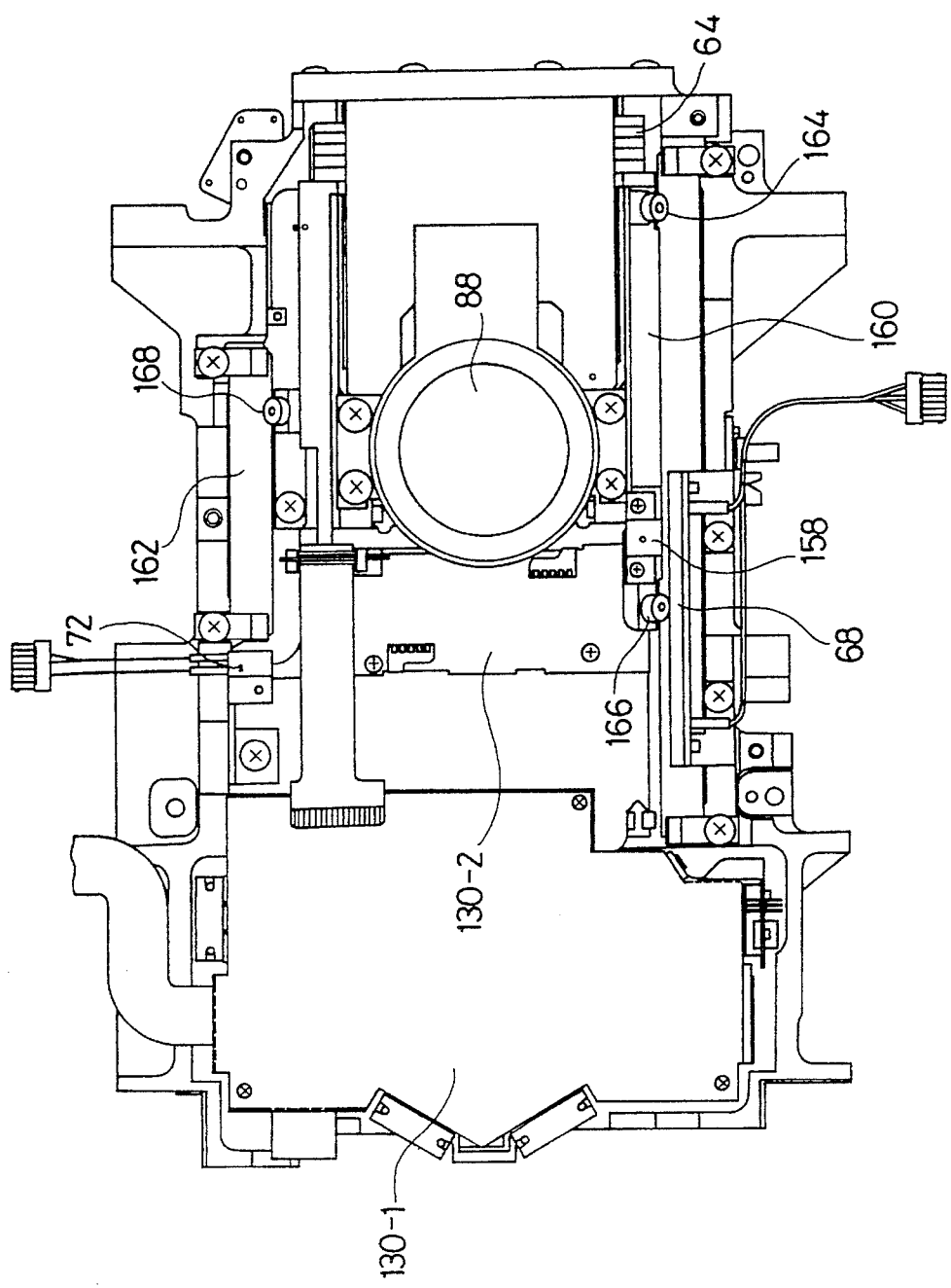
FIG. 11 is a plan view of the rear side of a head drive mechanism of the invention.

FIG. 11 shows a mechanism structure of the optical head and shows the bottom side to which a spindle motor is provided. A fixed head 130-1 is provided on the right side of a frame 155. A pair of rails 160 and 162 are provided on the right side of the frame which faces the fixed head 130-1. A moving head 130-2 is arranged on the rails 160 and 162 so as to be movable by rollers 164, 166, and 168. The spindle motor 88 is attached and fixed to the right side of the moving head 130-2 from the rear side. An optical disk medium in a cartridge which was loaded from the outside is attached to a chucking portion of a rotary shaft on the front side of the spindle motor 88. An LED 158 iS arranged on one side of the moving head 130-2 so as to irradiate the light to the outside. The lens position sensor 68 is arranged along the frame 155 at a position where the LED 158 faces. The head position sensor 68 is arranged within a moving range of the moving head 130-2. When the light from the LED 158 is irradiated to the head position sensor 68 in accordance with the moving position of the moving head 130-2, a current signal corresponding to the position where the light was irradiated is generated from the head position sensor 68. Due to this, the moving position of the moving head 130-2 can be linearly detected. The home position sensor 72 is arranged on the opposite side of the head position sensor 68. In a situation shown in the diagram, the moving head 130-2 is located at the initial position where the beam is irradiated to the home position of the innermost rim of the optical disk medium. In this state, the home position sensor 72 Generates a position detection signal.

Figure 12:
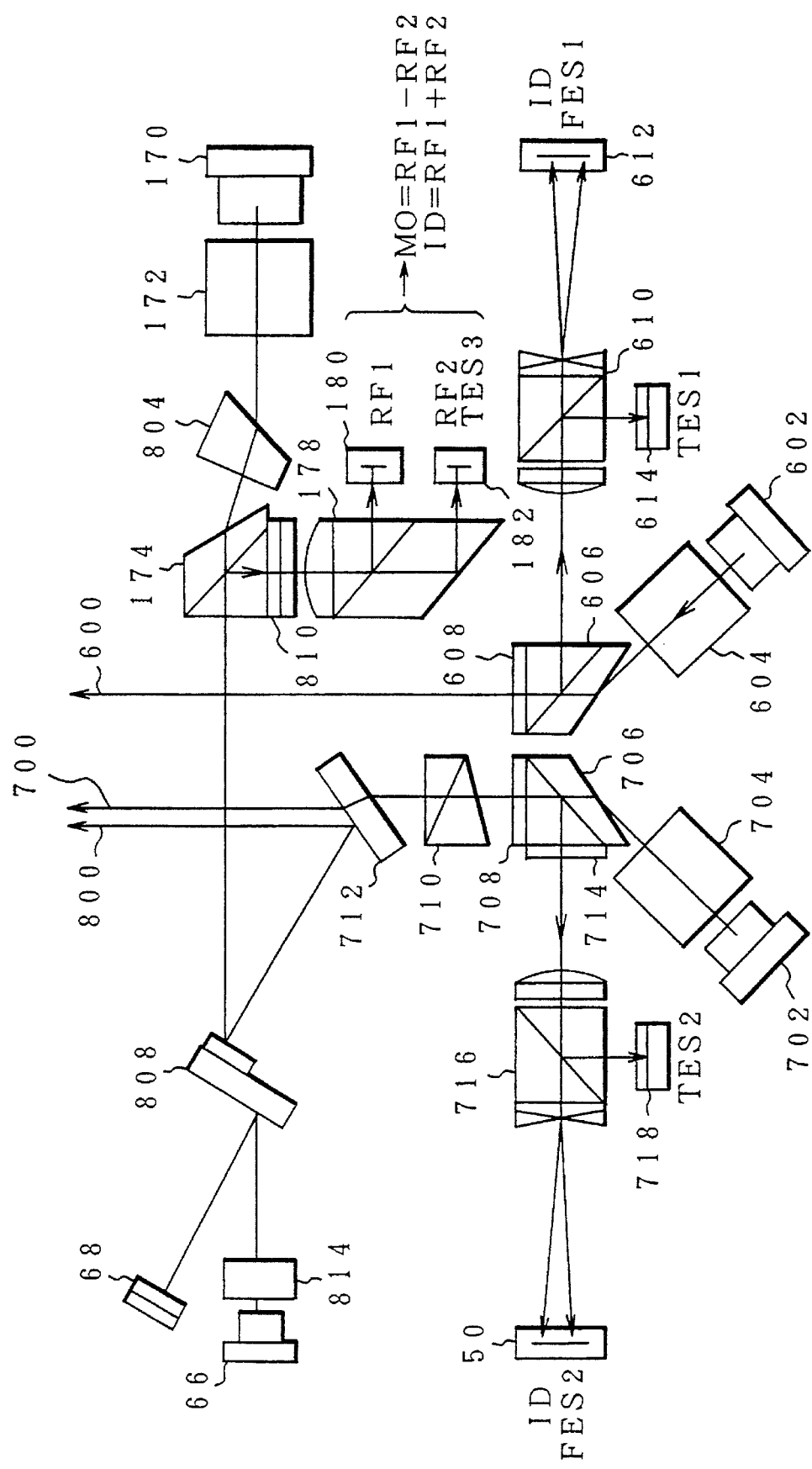
FIG. 12 is an explanatory diagram of an optical system built in a head fixing section in FIG. 11.

FIG. 12 shows an optical system provided in the head fixing portion in FIG. 11. The optical system of an erasing beam 600 will be first explained. The light of a laser diode 602 for an erasing beam is converted into a parallel beam by a collimating lens 604. The parallel beam passes through a beam splitter 606 and a λ/4 plate 608 and is Given to the objective lens of the moving optical system and is irradiated to the optical disk medium. The return light of the erasing beam 600 from the optical disk medium is reflected in the orthogonal direction by the polarization beam splitter 606, and after that, the return light passes through a Foucault optical section 610 and enters a photodetector 612. From the photosensitive output of the photodetector 612, a focusing error signal FES1 of an erasing beam 600 and an ID signal corresponding to a light intensity of a track pre-format section are formed. The return beam separated by the Foucault optical section 610 enters a photodetector 614, so that a tracking error signal TES1 according to a push-pull method (far-field method) is formed.

An optical system of a writing beam 700 will now be described. A laser diode 702 for writing generates the writing beam 700 which is emitted as a light pulse so as to obtain a writing power in accordance with a data bit 1 or 0. The writing beam 700 is converted into a parallel beam by a collimating lens 704. The converted beam subsequently passes through a deflecting beam splitter 706, a λ/4 plate 708, a color correction prism 710, and a dichroic mirror 712 and is irradiated to the optical disk medium through the objective lens of the moving optical system. The return light from the optical disk medium enters the deflecting beam splitter 706 through the same passage and is reflected in the orthogonal direction. The reflected light passes through a long pass filter 714 and enters a Foucault optical section 716. The Foucault optical section 716 is provided to obtain a focusing error signal FES2 by a Foucault method. A beam from the Foucault optical section 716 enters the photodetector 50, so that the focusing error signal FES2 of the writing beam 700 and an ID signal corresponding to a light intensity according to concave and convex portions of a track pre-format are formed. The return light of the writing beam 700 reflected in the orthogonal direction in the Foucault optical section 716 is given to a photodetector 718, so that a tracking error signal TES2 of the writing beam 700 according to the push-pull method (far-field method) is formed. Reasons why the long pass filter 714 is provided will now be described. When a verification read is executed by a reproducing beam 800 simultaneously with the writing operation by the writing beam 700, each of the return lights of the writing beam 700 and the reproducing beam 800 is simultaneously received from the light disk medium. Therefore, by the long pass filter 714, only the return light of the writing beam 700 having a long wavelength is allowed to pass and the return light of the reproducing beam 800 having a short wavelength is cut off.

An optical system of the reproducing beam 800 will now be described. A light from a laser diode 170 for reproduction is converted into a parallel beam by a collimating lens 172. After that, an optical path is changed by a prism 804 and passes through a beam splitter 174 and enters a galvano mirror 808. The reproducing beam 800 reflected by the galvano mirror 808 is reflected by the dichroic mirror 712 and passes through an objective lens of the moving optical system and is irradiated to the optical disk medium. The return light of the reproducing beam 800 from the optical disk medium is reflected by the dichroic mirror 712 and passes through the galvano mirror 808 and enters the beam splitter 174 and is reflected in the orthogonal direction. The return light reflected by the beam splitter 174 passes through a λ/4 plate 810 and enters a polarization beam splitter 178. The reflected S polarization component enters the photodetector 180 and the transmitted P polarization component enters the photodetector 182. From a photosensitive output of the photodetector 182, a tracking error signal TES3 and a high frequency signal RF2 which are based on the reproducing beam 800 are formed in accordance with the push-pull method (far-field method). A high frequency signal RF1 is formed from the photosensitive output of the photodetector 180. The high frequency signals RF1 and RF2 obtained on the basis of the photosensitive outputs of the photodetectors 180 and 182 are converted into a reproduction signal MO by a subtraction. An ID signal indicative of the light intensity due to the concave and convex portions of the pre-format portion is also obtained by the sum of them.

Namely, the reproduction signal MO and the ID signal can be obtained by the following equations.

$MO=RF1-RF2$ $ID=RF1+RF2$

Further, the laser diode 66, a collimating lens 814, and the lens position sensor 68 using a two-dividing photoreceptor are provided for the galvano mirror 808 in order to detect the mirror position. The light emitted from the laser diode 66 is converted into the parallel beam by the collimating lens 814. After that, the parallel beam is reflected by the rear surface of the galvano mirror 808 and enters the lens position sensor 68. A detection signal of the lens position sensor 68 is set to 0 at a neutral position of the galvano mirror 808 and generates a position signal whose polarity differs like a plus or minus polarity in accordance with the inclination direction of the galvano mirror 808.

[Retry function upon seeking]

Figure 1:
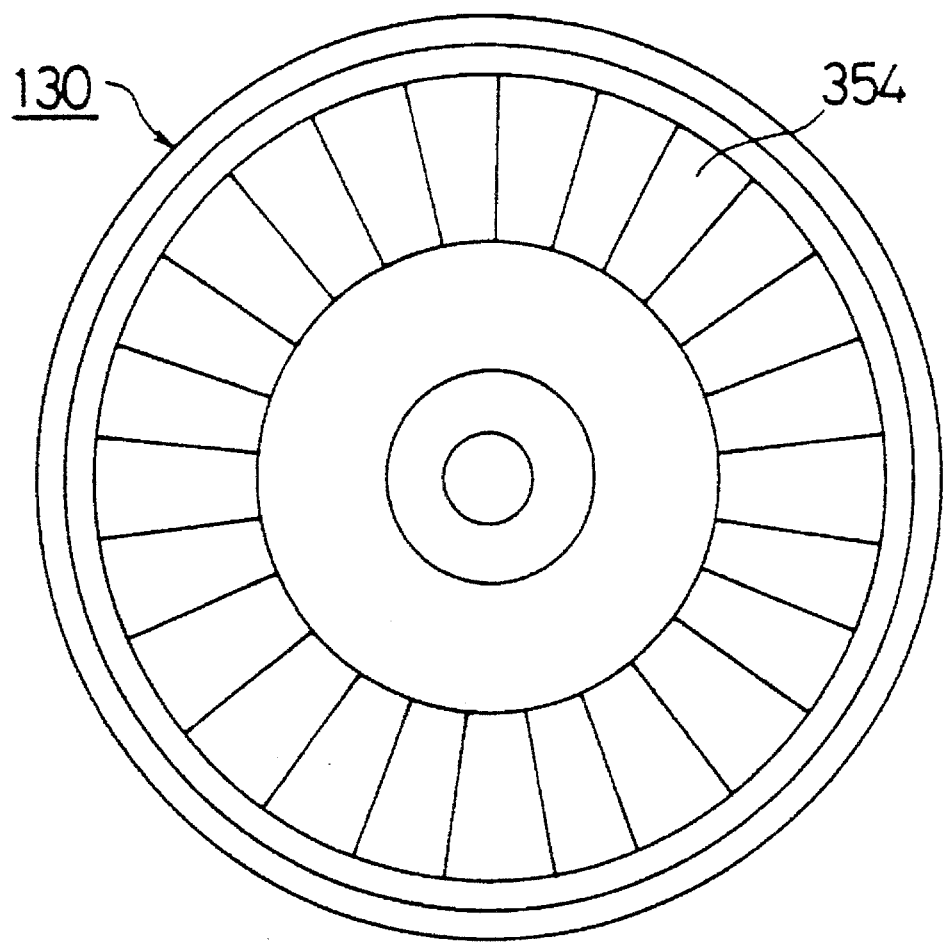
FIG. 1 is an explanatory diagram of a CAV format.
Figure 2:
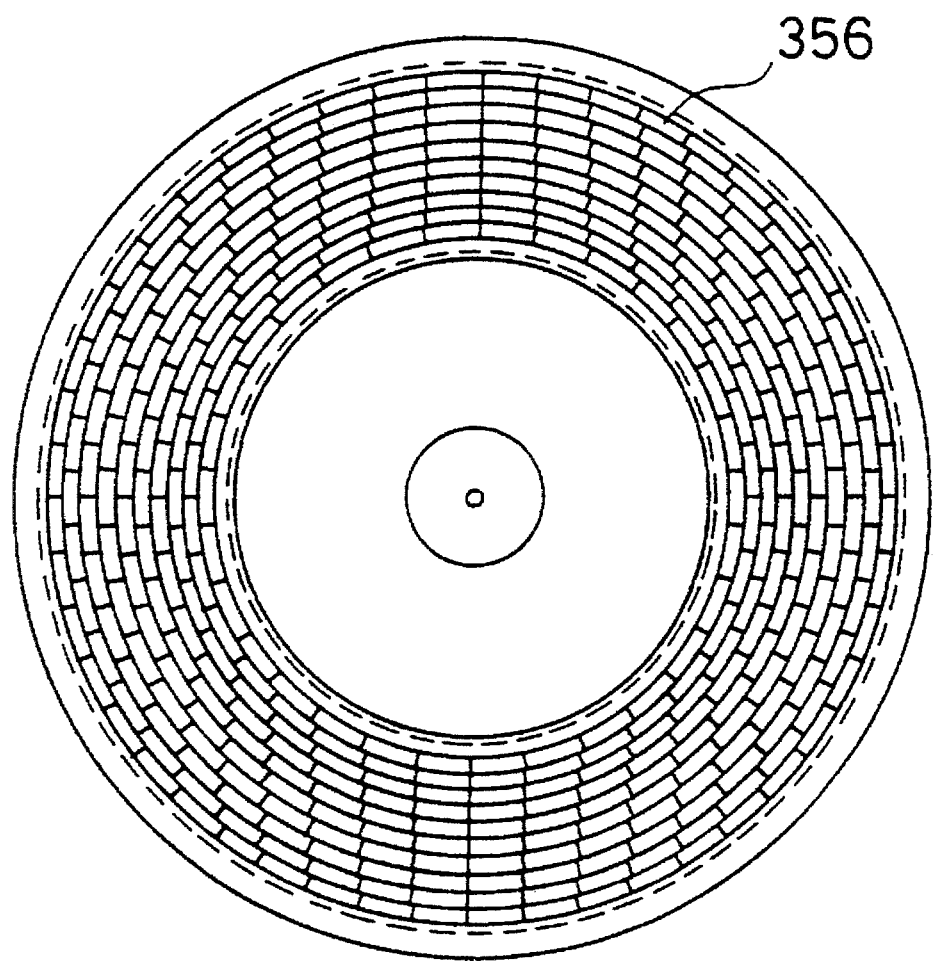
FIG. 2 is an explanatory diagram of an MCAV format.
Figure 3:
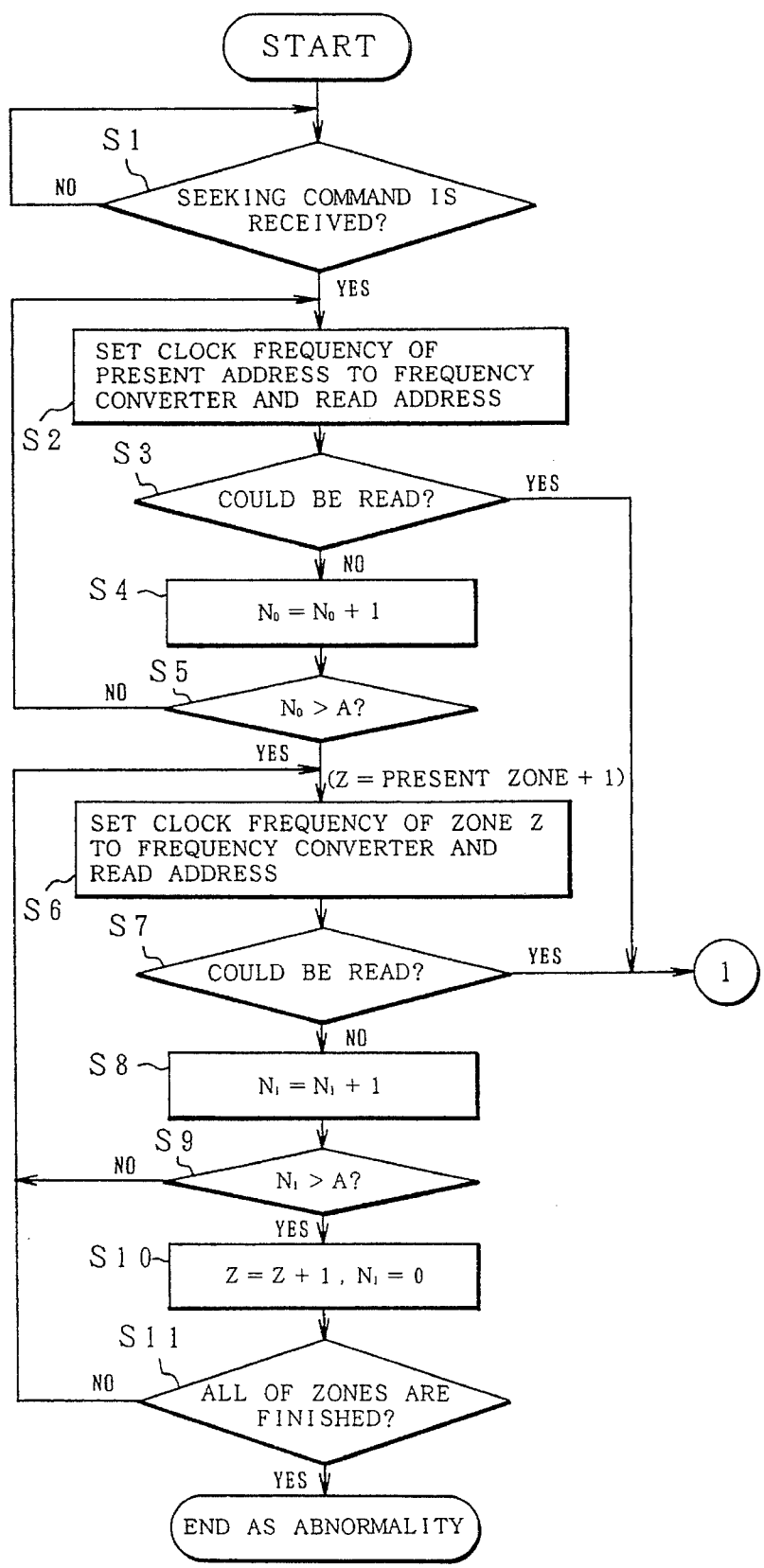
FIG. 3 is a flowchart of a conventional seeking operation which is accompanied with the switching of a clock frequency.
Figure 4:
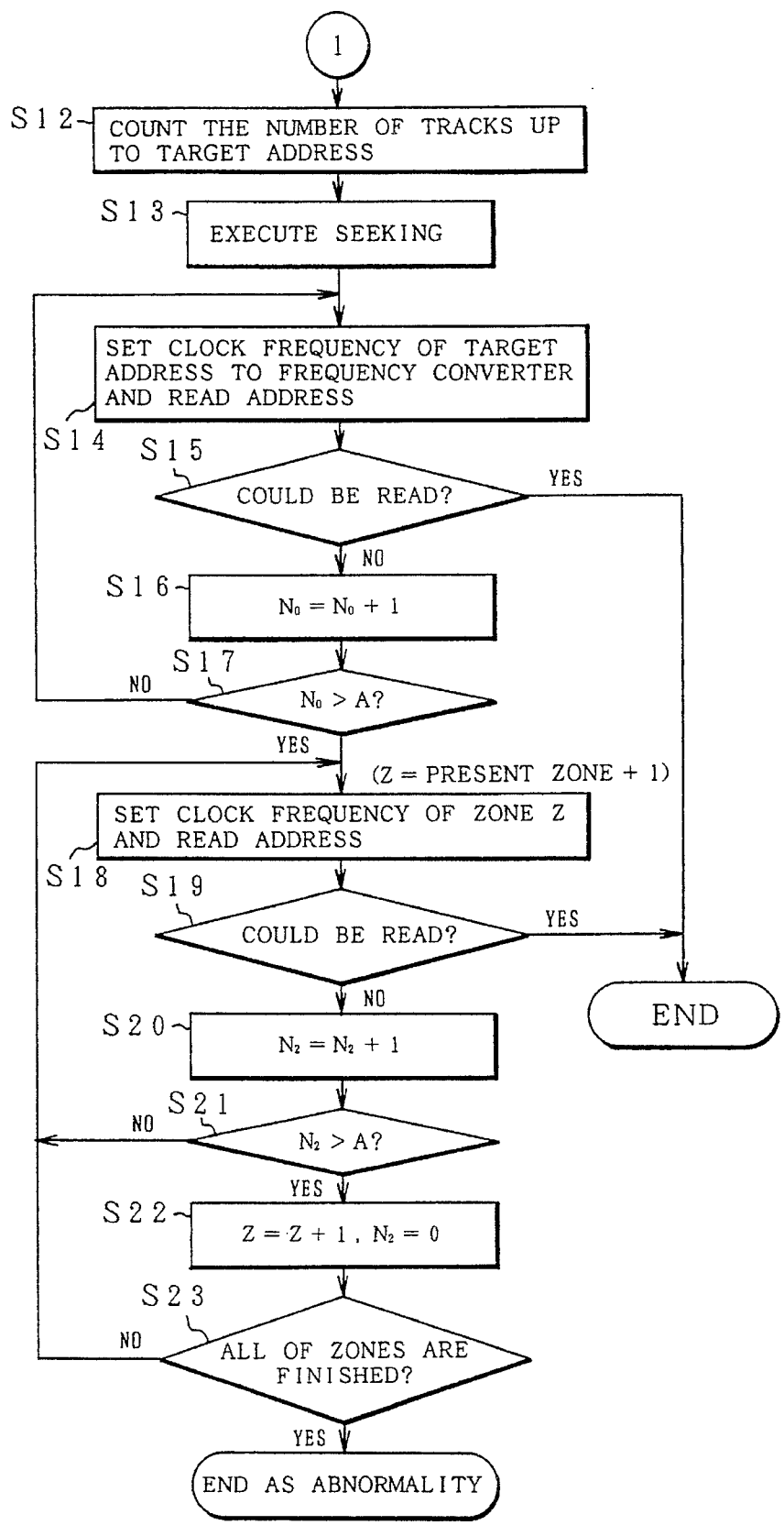
FIG. 4 is a (continuous) flowchart of the seeking operation which is accompanied with the switching of the clock frequency.

FIG. 13 shows a processing function by the MPU 12 in the seeking control. The MPU 12 comprises: an access control section 400, a track address judging section 402, a zone frequency storing table 404, a clock frequency selecting section 406, and a retry section 408. The zone frequency storing table 404 and the clock frequency selecting section 406 construct a frequency setting section 500. The access control section 400 performs a seeking control to the optical head 130 by the servo circuit section 46 on the basis of a seeking command from the upper apparatus. The access control section 400 recognizes the present track address at the start of the seeking on the basis of a value of the track counter 106 and obtains the number of tracks up to a target track. During the seeking operation, the access control section 400 calculates the number of remaining tracks from an increasing amount of the count value of the track counter 106. When the number of remaining tracks is equal to 0, the access control section 400 executes a track lead-in operation, thereby completing the seeking operation. The track address judging section 402 detects a track address from the read data obtained by the read circuit section 40 via the address control section 400 at the start of the seeking. The access control section 400 compares the detected track address with the present track address recognized on the basis of the track counter 106 and discriminates whether the track address is a correct track address or not. Predetermined clock frequency information which differs every zone according to the MCAV format in FIG. 2 has been stored in the zone frequency storing table 404. Specifically speaking, the table 404 stores the frequency division values M and N which are set into the frequency converter 140 in FIG. 10. A look-up table for converting a track address into a zone address is also provided. The track address is converted into the zone address by passing through the look-up table, so that the corresponding clock frequency information can be obtained. The clock frequency selecting section 406 reads out the corresponding clock frequency information from the zone frequency storing table 404 on the basis of the present track address recognized from the track counter 106 by the access control section 400 and sets into the frequency converter 140. When the track address judging section 402 judges a defective reading operation of the track address at the start of the seeking, the retry section 408 executes the retry process for switching the clock frequency of the frequency converter 140. As a process of the retry section 408, there are two processes such as retry process using the head position signal E3 from the head position sensor 70 and retry process using a home position signal E4 from the home position sensor 72. Either one of the retry processes can be executed. In the retry process using the head position signal E3 from the head position sensor 70, a zone is judged from the head position signal E3 and the clock frequency selecting section 406 is allowed to switch the frequency and the clock address is again read. On the contrary, in the retry process using the home position signal E4 of the home position sensor 72, the optical head 130 is forcedly moved to the home position and an initialization to switch the frequency to the clock frequency of the zone decided by the home position is executed and, after that, the track is again read at the home position.

In any one of the retry processes, when the reading of the track address succeeds, the seeking control is performed. After completion of the seeking, the track address is again read by the clock frequency corresponding to the zone of a target track and a check is made to see if the frequency has been switched to the correct clock frequency or not. When the track address can not be read by the reading after completion of the seeking, a retry process similar to that at the start of seeking is again performed.

[Retry process upon seeking using the head position sensor]

Figure 14:
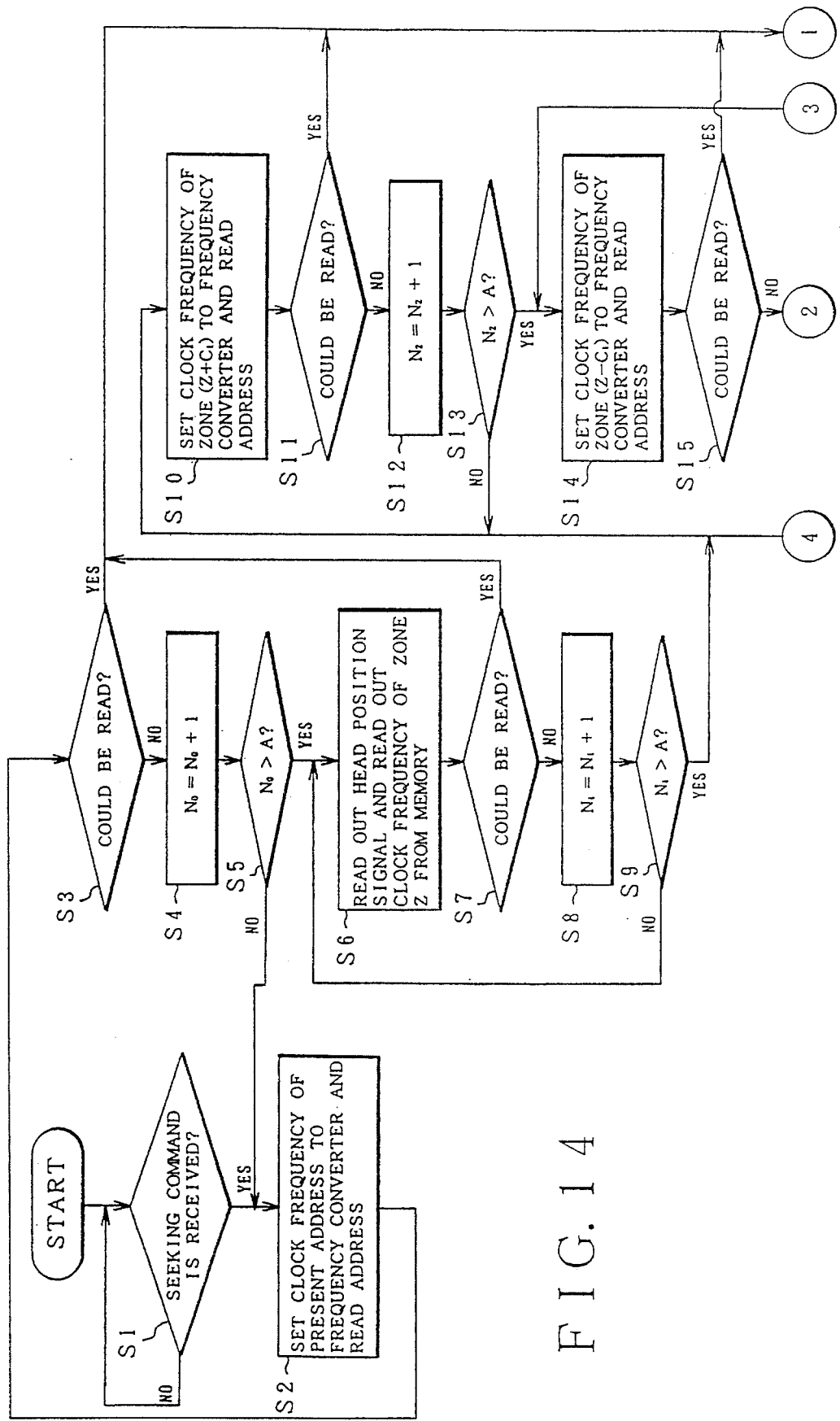
FIG. 14 is a flowchart for the processing operation in FIG. 13 using a head position sensor.

A flowchart in FIG. 14 shows a retry process using the detection signal of the head position sensor. When a seeking command is received from the upper apparatus in step S1, the processing routine advances to step S2. In step S2, the clock frequency selecting section 406 reads out the frequency information of the corresponding zone from the zone frequency storing table 404 by using the track address which is now recognized by the access control section 400 and sets into the frequency converter 140 and the track address is read by the read circuit section 40. A check is made in step S3 to see if the track address could be read or not. If YES, the processing routine advances to the seeking operation in step S20 in FIG. 15. If the track address could not be read, the count value of a retry counter NO is increased by one in step S4. Until the value of the retry counter NO exceeds a predetermined number (A) of retry times in step S5, the reading operation of the track address by the setting of the clock frequency corresponding to the present track address in step S1 is repeated. In the case where the track address could not be correctly read even if the processes in steps S2 to S5 were repeated (A) times, step S6 follows. In step S6, the retry processing section 408 sets a clock frequency of the zone detected from the head position signal of the head position sensor 70. Namely, the head position signal of the head position sensor 70 is read out, an actual track address in which the beam is irradiated at present is detected, frequency information of the zone corresponding to the track address detected by the clock frequency selecting section 406 is selected from the zone frequency storing table 404 and is set into the frequency converter 140, thereby reading the track address. Subsequently, in step S7, a check is made to see if the track address could be read or not by the setting of the clock frequency based on the head position signal. In this instance, if the beam irradiating position is not located near the boundary of a certain zone, even if there are a few detection errors in the track addresses detected from the head position signal of the head position sensor 70, the track address is included in the same zone as that of the correct track address. Therefore, the zone is accurately recognized from the head position signal of the head position sensor 70 and the track address can be read by the setting of the correct clock frequency. If the track address could be read, the processing routine advances to the seeking operation in step S20 in FIG. 15 from step S7. On the other hand, in the case where the track address detected from the head position sensor 70 is located near the boundary of a certain zone, there is a case where an adjacent zone is erroneously recognized due to the detection error. In such a case, even if a clock frequency is set on the basis of the head position signal of the head position sensor 70 and the retry process is repeated until the retry counter N1 reaches a predetermined number (A) of retry times in steps S8 and S9, the track address cannot correctly be read. Therefore, the processing routine advances to the retry process in the next step S10.

In step S10, clock frequency information of a zone (Z+C1) which is obtained by adding a constant C1 to the present zone Z detected on the basis of the head position signal is selected from the zone frequency storing table 404 by the clock frequency selecting section 406 and is set to the frequency converter 140, so that a track address is read. The constant C1 is set to 1 (C1=1) in the initial state. Therefore, in step S10, a clock frequency of, for example, the adjacent zone (Z+1) on the outer rime side which is obtained by adding "1" to the zone Z detected from the head position signal is first set and the track address is read. Due to this, in the case where the track address detected from the head position signal is deviated to the adjacent zone on the outer rim side, the correct clock frequency is set in step S10 and the track address can be read in step S11. In the case where the track address could not be read even by the setting of the clock frequency of the zone (Z+C1) in step S10, the count value of a retry counter N2 is increased by "1" in step S12 and the reading operation of the track address by the setting of the same clock frequency is repeated until the count value of the retry counter N2 reaches the predetermined number (A) of retry times in step S13. When the count value of the retry counter N2 exceeds the number (A) of retry times, step S14 follows and the clock frequency selecting section 406 selects clock frequency information of the zone (Z−C1) which is obtained by subtracting the constant C1 from the zone Z detected from the head position signal from the zone frequency storing table 404 and sets into the frequency converter 140, thereby reading the track address. The constant C1 is equal to 1 (C1=1) in the initial state in a manner similar to step S10. Therefore, by setting a clock frequency of the adjacent zone (Z−1) on the inner rime side which is smaller by one than the zone Z detected from the head position signal, a track address is read. Due to this, in the case where the zone on the inner rime side is recognized and the track address cannot be read by the erroneous detection of the track address based on the head position signal, the track address can correctly be read by the setting of the clock frequency of the zone (Z−1) in step S14. When it is judged that the track address could be read in step S15, the processing routine advances to the seeking operation of step S20 in FIG. 15. In the case where the track address could not be read in step S15, the processing routine advances to step S16 in FIG. 15 and the count value of a retry counter N3 is increased by "1". Until the count value of the retry counter N3 reaches the predetermined number (A) of retry times in step S17, the reading operation of the track address by the setting of the same clock frequency is repeated. When the count value of the retry counter N3 exceeds the number (A) of retry times in step S17, step S18 follows. In step S18, the constant C1 is increased by "1", so that the constant C1 is set to 2. The retry counters N2 and N3 are reset to 0. After that, if the processes of all of the zones are not finished in step S19, the processing routine is again returned to step S10 in FIG. 13. In the processes of steps S10 to S17 at the second time, the retry process such that clock frequencies of the zones (Z+2) and (Z−2) which are neighboring to the further inner rime side and the further outer rime side of the zones (Z+2) and (Z−2) are set and the track addresses are read is repeated. The foregoing processes are repeated until the processes for all of the zones are finished in step S18. When the track address cannot be read even by the above processes, the processing routine is finished as an abnormality.

Figure 15:
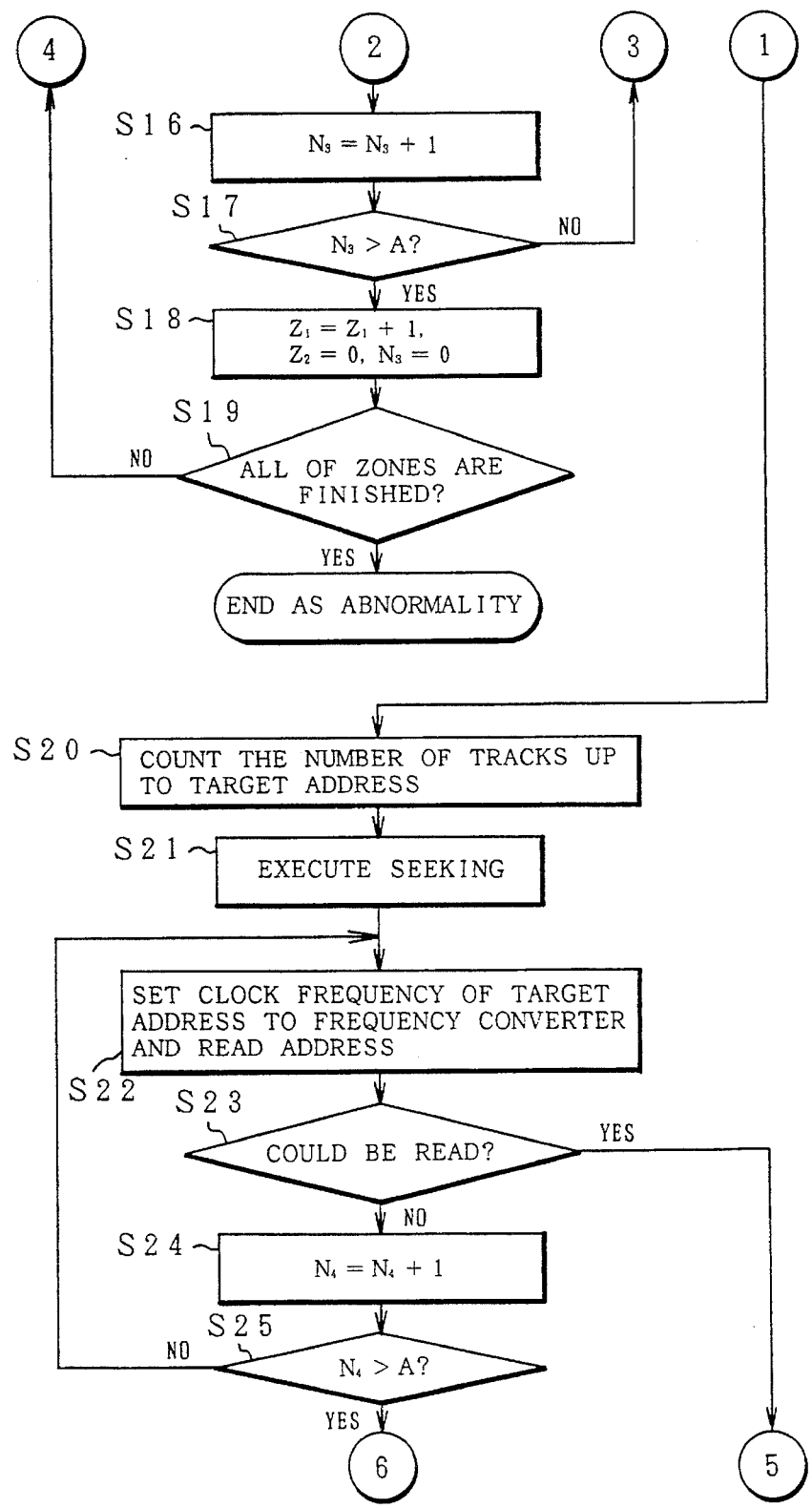
FIG. 15 is a (continuous) flowchart for the processing operation in FIG. 13 using the head position sensor.
Figure 16:
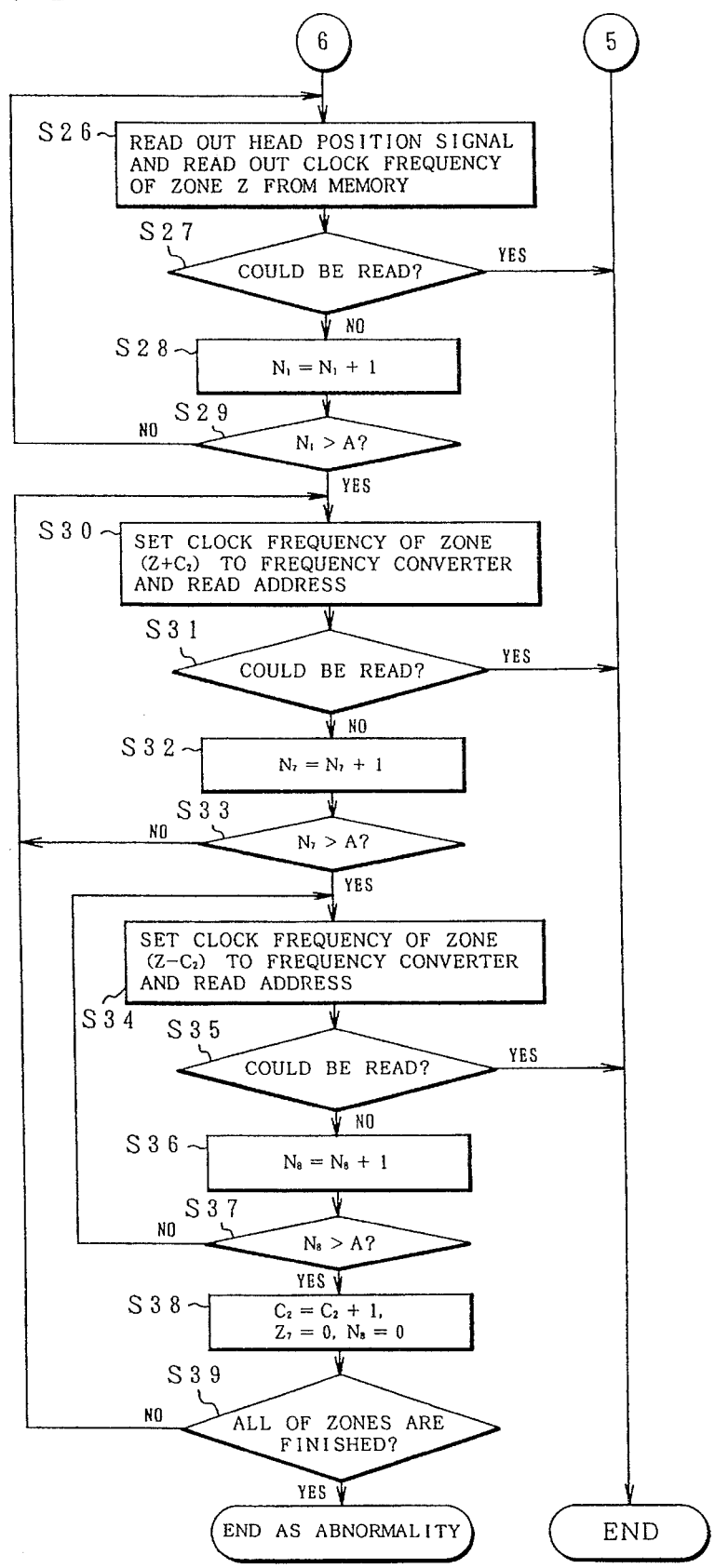
FIG. 16 is a (continuous) flowchart for the processing operation in FIG. 13 using the head position sensor.

On the other hand, in the case where the track address could correctly be read by the reading operation of the track address at the start of the seeking in steps S1 to S18, the processing routine advances to step S20 in FIG. 15 and the seeking operation is started. As a seeking operation, the number of tracks from the present track address to the target track address is counted in step S20. After that, the seeking operation for moving the optical head 130 toward the target track by the servo circuit section 46 is executed in step S21. During the seeking operation, the number of tracks up to the target track address obtained in step S20 is subtracted by a track crossing pulse which is obtained from the track error signal and the number of remaining tracks up to the target track is always monitored. The speed of the optical head 130 is controlled by the driving of the VMC coil 64 by the servo circuit section in FIG. 8 during the seeking operation. When the number of remaining tracks up to the target track is equal to 0 during the seeking operation, the lead-in operation to the target track is executed and the control is switched to the fine control (tracking control) at the end of the lead-in operation. When the seeking operation is finished, the clock frequency of the target address is set to the frequency converter 140 and a track address is read in step S22. Due to this, a check is made to see if the target track address could correctly be read or not. When the target track address can be read in step S23, step S12 follows and the processing routine is finished as a normality. When the target track address cannot correctly be read, the count value of a retry counter N4 is increased by "1" in step S24 and the reading operation of the address by the setting of the clock frequency of the zone corresponding to the target track address in step S22 is repeated until the count value of the retry counter N4 reaches the number (A) of retry times. In the case where the target track address cannot be read by the retry process in steps S22 to S25, the retry process in steps S26 to S39 in FIG. 16 is executed. The retry process is fundamentally the same as the retry process in steps S6 to S19 at the start of the seeking operation shown in FIGS. 14 and 15. That is, in steps S26 to S29, a track address is detected from the head position signal of the head position sensor 70 and a clock frequency of the corresponding zone is set into the frequency converter and the track address is read. If the track address could not be read, in steps S30 to S33, the clock frequency of the neighboring zone (Z+1) on the outer rim side which is obtained by adding a constant C2=1 to the track address detected by the head position signal is set and the track address is read. If the track address could not be read even by the above process, in the processes in steps S34 to S37, the clock frequency of the adjacent zone (Z−1) on the inner rim side which is obtained by subtracting the constant C2=1 from the zone Z including the track address detected from the head position signal is set and the track address is read. Further, if the track address could not be read, the constant C2 is increased by "1" in step S33 and the clock frequencies of the zones (Z+2) and (Z−2) which are further neighboring by one zone are set, thereby reading the track address. Even if the track address could not be read even by executing the reading operation of the track address using the clock frequencies of all of the zones in step S34, the processing routine is finished as abnormality. The processing routine is finished as an abnormality by the retry processes at the start and end of the seeking operation in case of a failure such as a hardware error or the like which cannot be recovered. In case of an erroneous detection by the head position signal, the track address can be read at an early stage of the retry process and the processing routine can be shifted to the end as a normality.

[Retry process at the time of seeking using the home position sensor]

Figure 17:
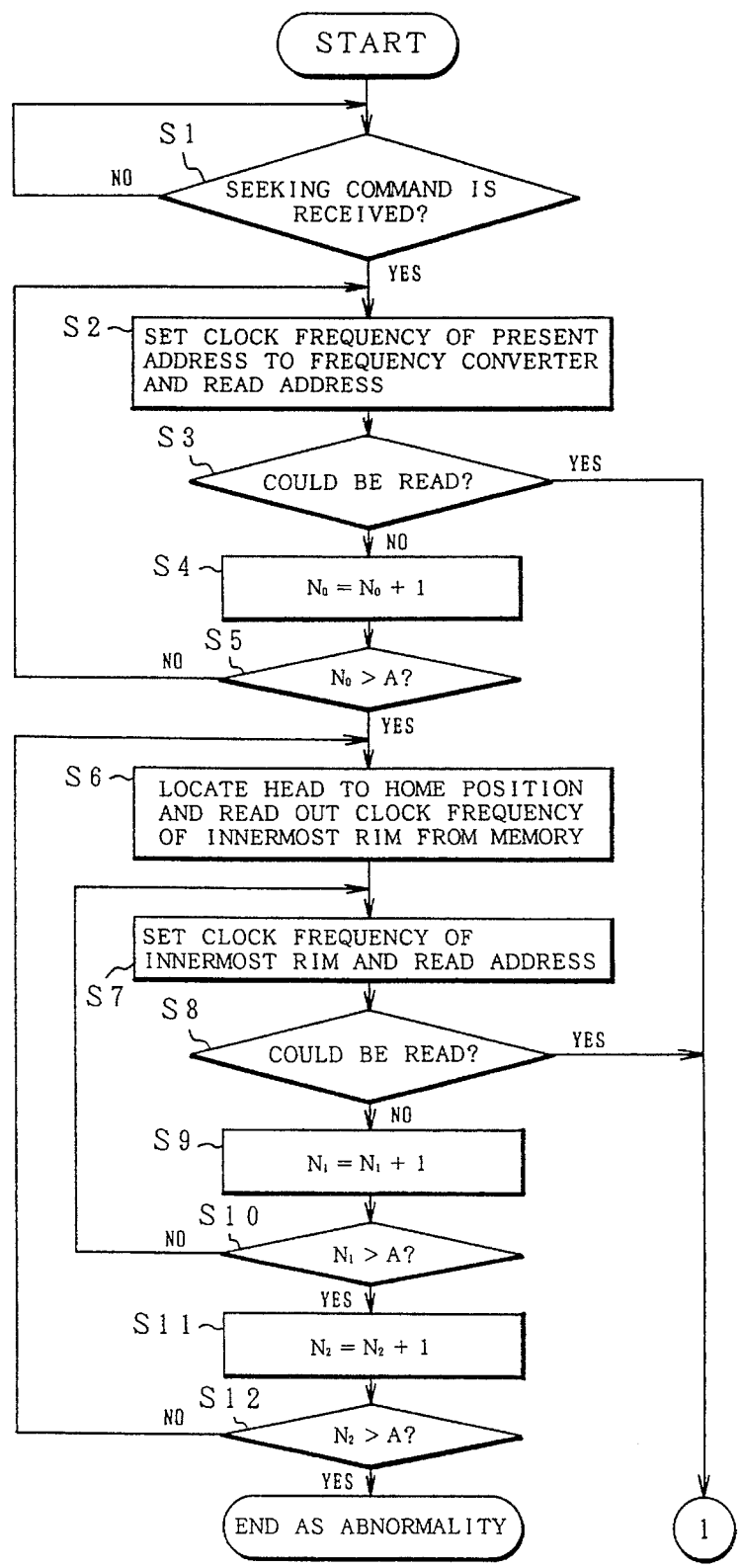
FIG. 17 is a flowchart for the processing operation in FIG. 13 using a home position sensor.
Figure 18:
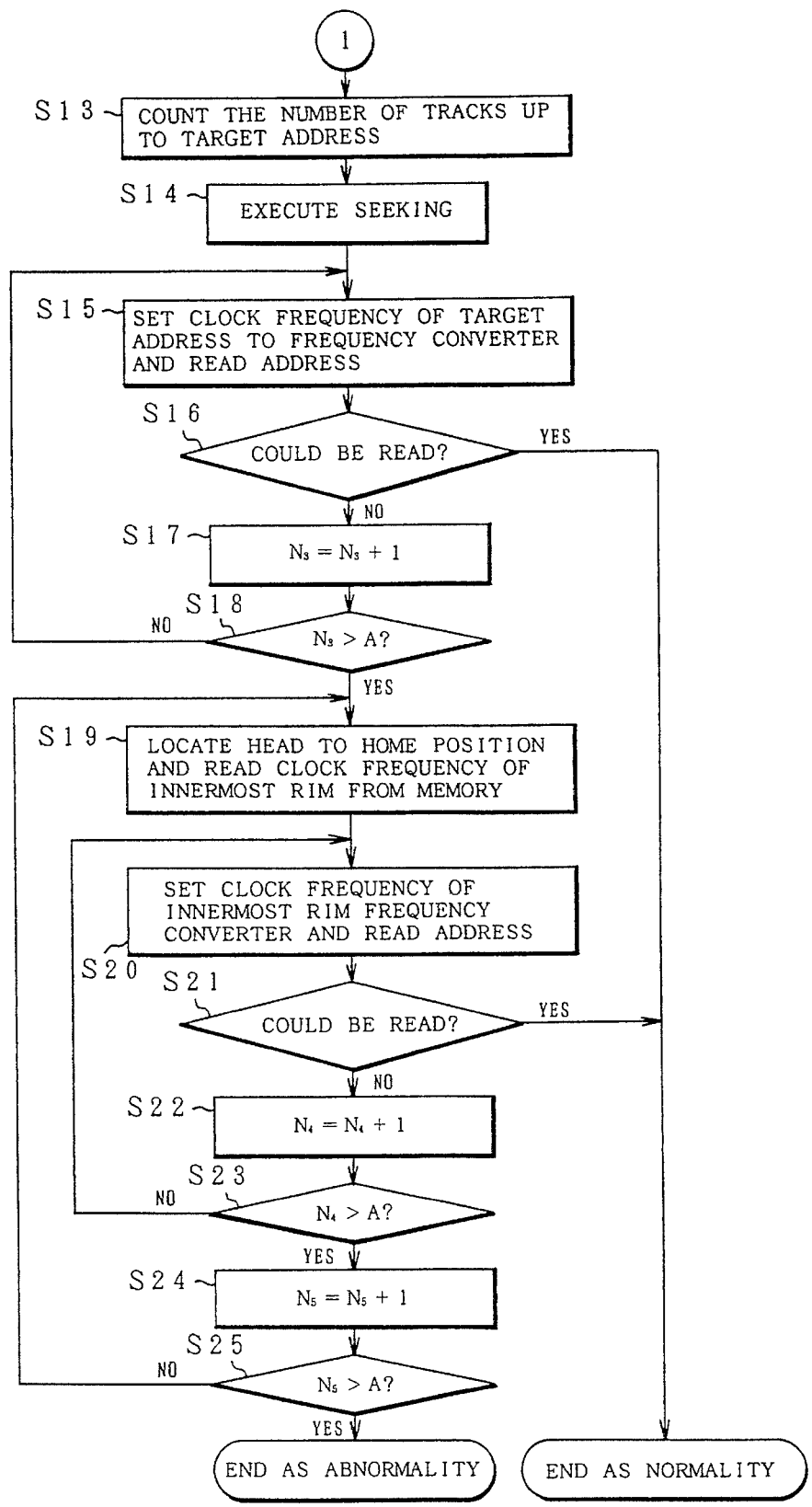
FIG. 18 is a (continuous) flowchart for the processing operation in FIG. 13 using the home position sensor.

FIGS. 17 and 18 show flowcharts for the retry process using the detection signal of the home position sensor. In FIG. 17, a seeking command is received in step S1 and the clock frequency of the zone corresponding to the present track address which is recognized by the access control section 400 is selected from the zone frequency storing table 404 by the clock frequency selecting section 406 and is set into the frequency converter 140 and the track address is read in step S2. When the track address has been read in step S3, the processing routine advances to the seeking operation shown in step S13 in FIG. 18. When the track address cannot be read in step S3, the processes in steps S2 and S3 are repeated until the count value of the retry counter N0 reaches the predetermined number (A) of retry times by processes in steps S4 and S5. In the case where the track address could not be read even if the processes in steps S2 to S5 were repeated, step S6 follows and the optical head 130 is forcedly moved and positioned to the home position of the innermost rim of the optical disk medium by the access control section 400. When the movement of the optical head 130 to the home position is recognized by the home position detection signal from the home position sensor 72, the clock frequency selecting section 406 reads out the clock frequency information corresponding to the innermost rim zone at the home position from the zone frequency storing 'table 404. Subsequently, in step S7, the zone frequency storing table 404 is set into the frequency converter 140 and the track address is read. When the optical head 130 can normally be positioned to the home position and the detection signal can normally be obtained from the home position sensor 72, the track address of the innermost rim can be read by the setting of the clock frequency of the zone corresponding to the home position. The above process relates to the initialization of the clock frequency and the processing routine advances to the seeking operation in step S13.

On the other hand, in the case where the optical head 130 is not correctly positioned to the home position or where the position detection was performed before the optical head 130 is positioned to the home position because of the erroneous operation of the home position sensor 72, even if the clock frequency of the innermost rim zone is set, the track address cannot be read. In this case, as shown in steps S9 to S12, the reading operation of the track address using the clock frequency of the innermost rim zone which was set in step S7 is repeated until the count value of the retry counter N1 reaches the predetermined number (A) of retry times. Even if the track address could not be read by the above processes, the count value of the retry counter N2 is increased in step S11. After that, the processing routine is returned to step S6 and the seeking operation to position the optical head 130 to the home position is again executed until the count value of the retry counter N2 reaches the predetermined number (A) of retry times in step S12. In the case where the track address cannot be read even if such retry processes in steps S6 to S12 were repeated, a hardware error is judged and the processing routine is finished as abnormality.

In the case where the track address could normally be read at the start of the seeking in step S3 or where the track address could normally be read in a state in which the optical head 130 was positioned to the innermost rim in step S8, the processing routine advances to the seeking operation in step S13 in FIG. 18. First, the number of tracks up to the target track address is counted in step S13. In the normal reading operation at the start of the seeking in step S3, the number of tracks from the present track address recognized by the access control section 400 up to the target address is counted. On the other hand, with-respect-to-the-normal reading operation of the track address after that the optical head 130 was positioned to the home position in step S8, the number of tracks from the home position up to the target track address is counted. Subsequently, the seeking operation is executed by controlling the speed of the optical head 130 in step S14. When the seeking operation is finished, the clock frequency of the zone corresponding to the target track address is set to the frequency converter 140 and the track address is read in step S15. When it is discriminated in step S16 that the track address could normally be read, a series of seeking operations are finished and the processing routine is finished as normality and is shifted to the reading operation or writing operation in the tracking control state. In the case where the track address could not be read in step S16, the processes in steps S15 to S18 are repeated until the count value of the retry counter N3 reaches the predetermined number (A) of retry times in steps S17 and S18. Even if the track address could not be read by the above processes, the retry process shown in steps S19 to S25 is executed. This retry process is the same as the retry process to position the optical head 130 at the start of the seeking to the home position and to set the clock frequency of the innermost rim zone and to read the track address shown in steps S6 to S12 in FIG. 17.

[Suppression of back talk noises in the data reproducing mode]

Figure 19:
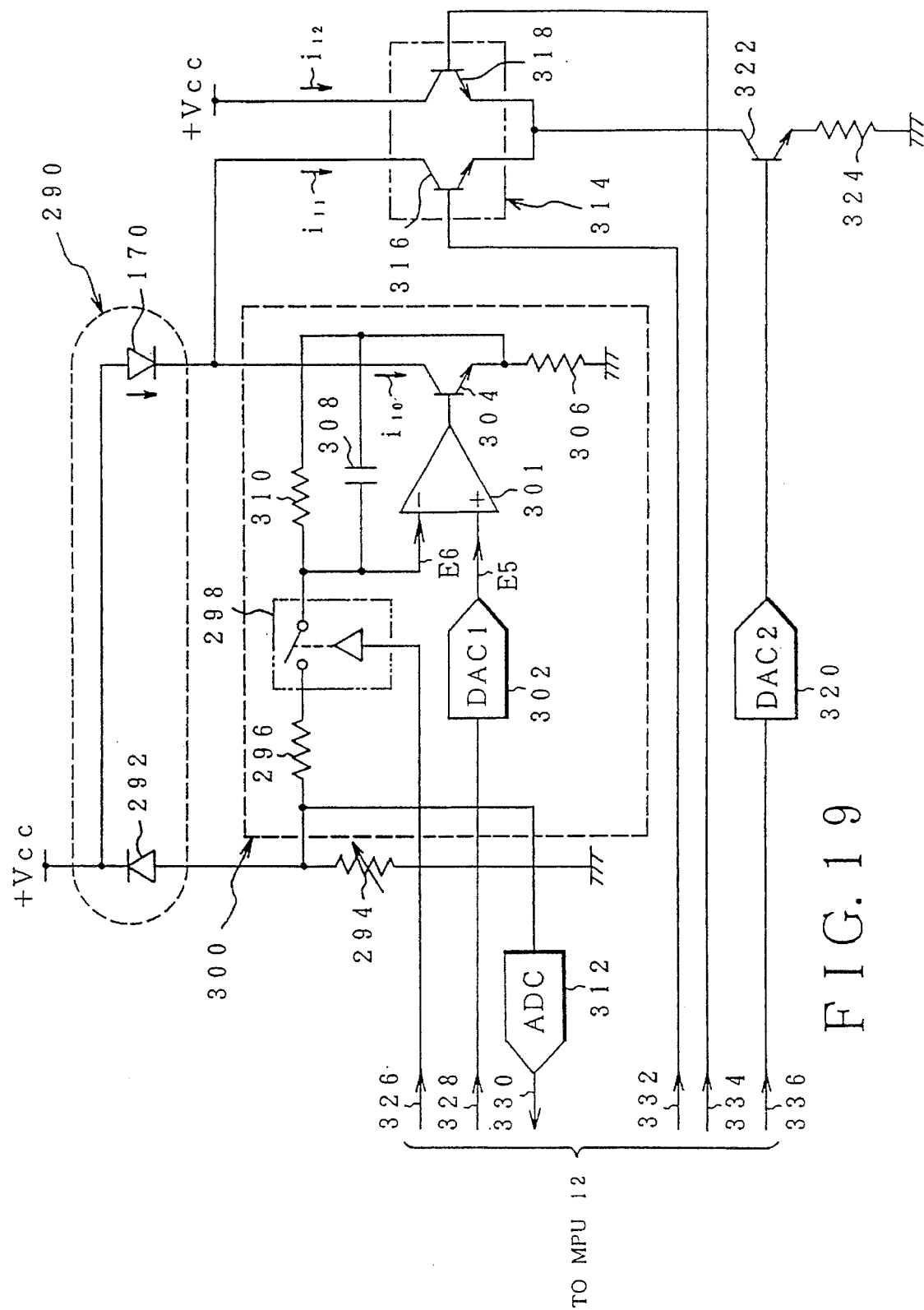
FIG. 19 is a block diagram of a circuit construction of a laser beam control section for reproduction according to the invention.

FIG. 19 is an embodiment of a laser beam control section to reproduce data which is used in the optical disk apparatus of the invention. A laser diode unit 290 is constructed by the laser diode 170 for reading and a photodiode 292 for monitoring and they are optically connected in the internal portion. The laser diode 170 and the photodiode 292 apply a power source bias by connecting a common use terminal to a power source +Vcc. A variable resistor 294 for converting a photosensitive current into a voltage signal is connected to an anode terminal of the photodiode 292. The laser diode 170 is controlled by an automatic light emission control circuit 300. The automatic light emission control circuit 300 comprises: resistors 296, 306, and 310; a capacitor 308; an analog switch 298; an operational amplifier 301; a D/A converter 302; and a transistor 304. The automatic light emission control circuit 300 is made operative by turning on the analog switch 298 by a control signal 326 from the MPU 12. In the ON state of the analog switch 298, the MPU 12 inputs specified light emission data 328 to the D/A converter 302 and inputs a standardized voltage E5 serving as a target value to the operational amplifier 301. Even if there is a variation in coupling efficiency of the laser diode unit 290, the variable resistor 294 connected to the photodiode 292 adjusts and standardizes a resistance value so as to obtain a detection voltage E6 for an unit light output of the laser diode 170. In the initial state, the laser diode 170 stops a light emission and a monitor voltage E6 based on a photosensitive current of the photodiode 292 for the operational amplifier 301 is equal to 0 V. Due to this, the transistor 304 is turned on by an output of the operational amplifier 301 corresponding to the standardized voltage E5 as a target value and a drive current $i_{10}$ which is supplied to the laser diode 170 is increased. When the value of the drive current $i_{10}$ exceeds a light emission start point of the laser diode 170 by an increase in drive current $i_{10}$, the light emitting operation is started and the photosensitive current flows in the variable resistor 294 from the photodiode 292 and the monitor voltage E5 for the operational amplifier increases. When the monitor voltage E6 coincides with the standardized voltage E5 from the D/A converter 302, the operational amplifier 301 stops the increase in the drive current $i_{10}$ flowing in the laser diode 170 by the transistor 304 and performs a feedback control so as to keep a light emission amount which is decided by the standardized voltage E5. A fluctuation of the drive current $i_{10}$ flowing in the laser diode 170 by the transistor 304 is detected by the current detection resistor 306 and is returned to the operational amplifier 301 through the parallel circuit of the resistor 310 and the capacitor 308, so that the constant current control to keep a constant current value that is decided by the standardized voltage E5 is performed. The monitor voltage detected by the variable resistor 294 connected to the photodiode 292 is converted into digital-like detection data 330 by an A/D converter 312 and is sent to the MPU 12. A high frequency modulating circuit 314 is provided in parallel with the automatic light emission control circuit 300 provided for the laser diode 170. The high frequency modulating circuit 314 has transistors 316 and 318 whose emitters are commonly connected. A transistor 322 is connected to the emitter in series. A collector of the transistor 316 is connected the laser diode 170 in parallel with the transistor 304 of the automatic light emission control circuit 300. A collector of the transistor 318 is connected to the power source +Vcc and receives the power source bias. High frequency signals 322 and 324 each having a predetermined frequency are input to bases of the transistors 316 and 318 from the MPU 12. The high frequency signal 334 is a signal which is obtained by inverting the high frequency signal 332. The transistor 322 connected serially to the modulating circuit 314 changes currents $i_{11}$ and $i_{12}$ which alternately flow in the transistors 316 and 318. $i_{11}$ is equal to $i_{12}$. An output of a D/A converter 320 is connected to a base of the transistor 322. Modulation amount data 336 which decides a modulation amount due to the high frequency modulating circuit 314 is input to the D/A converter 320 from the MPU 12. A resistor 324 for current limitation is connected to an emitter of the transistor 322. In this case f a time constant by the resistor 310 and capacitor 308 of the feedback circuit of the operational amplifier 301 provided for the automatic light emission control circuit 300 is set to be enough larger than the frequencies of the high frequency signals 332 and 334 from the MPU 12 to the high frequency modulating circuit 314. Consequently, the automatic light emission control circuit 300 isn't influenced by a change in modulation current which flows in the laser diode 170 by the switching of the transistors 316 and 318 of the high frequency modulation circuit 314 by the high frequency signals 332 and 334.

Figure 20:
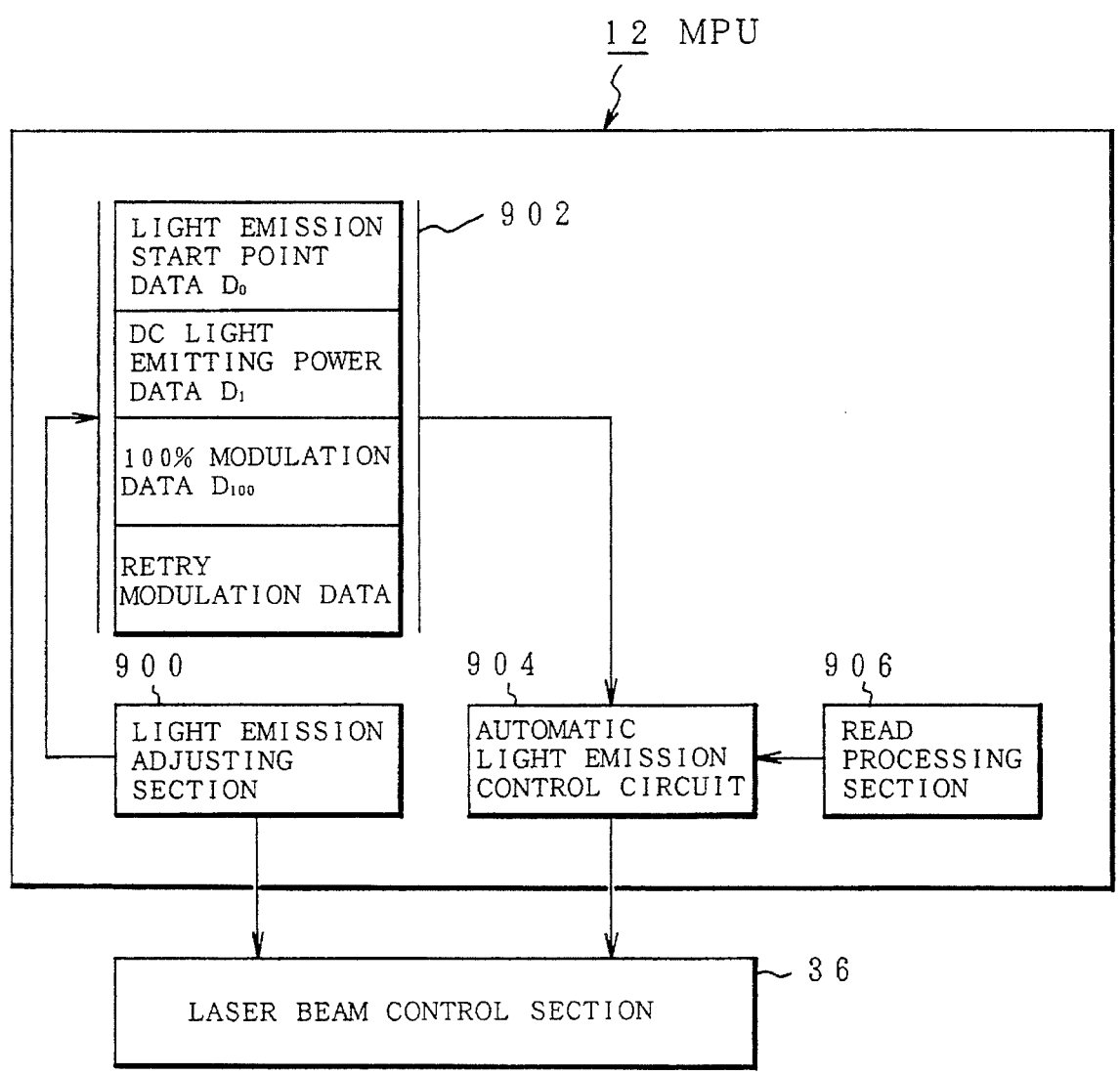
FIG. 20 is an explanatory diagram of the function of an MPU which executes the laser beam control in FIG. 19.

FIG. 20 shows functions of the MPU 12 for controlling the laser beam control section for reproduction in FIG. 19. The MPU 12 comprises: a light emission adjusting section 900; a memory table 902 as a control data set; an automatic light emission control section 904; and a read processing section 906. The circuit section for reproduction shown in FIG. 19 is provided for the laser beam control section 36. The light emission adjusting section 900 sets a light emission adjusting mode at the time of activation by the turn-on of a power source of the apparatus. In the light emission adjusting mode, the drive current of the laser diode 170 is increased, light emission start point data $D_0$ by which the light emission was started and DC light emission power data $D_1$ at an operation point at which a specified reproduction light emitting power is obtained are detected and stored into the memory table 902. When the light emission start point data $D_0$ and the specified DC light emission power data $D_1$ are obtained, 100% modulation data $D_{100}$ is calculated as data which is obtained by doubling a difference ($D_1-D_0$) of them and is stored. Further, retry modulation data which is obtained by multiplying a predetermined modulation coefficient (K) to the 100% modulation data $D_{100}$ is obtained and stored. Modulation data of 0% to 100% for 0 to 1 can be prepared as a coefficient (K) which is used for the calculation of the retry modulation data. Further, when controlling the modulation amount, it is necessary to also change the drive current $i_{10}$ of the automatic light emission control circuit 300 serving as a modulation base current (DC light emission current). Therefore, light emission data DAC1 for the D/A converter 320 is also changed. The light emission data DAC1 which is used at the time of the modulation will be explained in detail in the light emission adjusting process in FIG. 21. Modulation data exceeding 100% can be also used by further setting the modulation coefficient (K) to a value which is equal to or larger than "1". The automatic light emission control section 904 executes the reading operation by multiplying a high frequency modulation of a lower modulation amount, for example, 50% modulation amount'to the laser diode 170 in a normal operating state after completion of the process by the light emission adjusting section 900. When a notification of the occurrence of the error exceeding the correcting ability by the error correction code is received from the read processing section 906 in association with the reading operation, the retry operation to increase or decrease the light modulation amount is executed.

Figure 21:
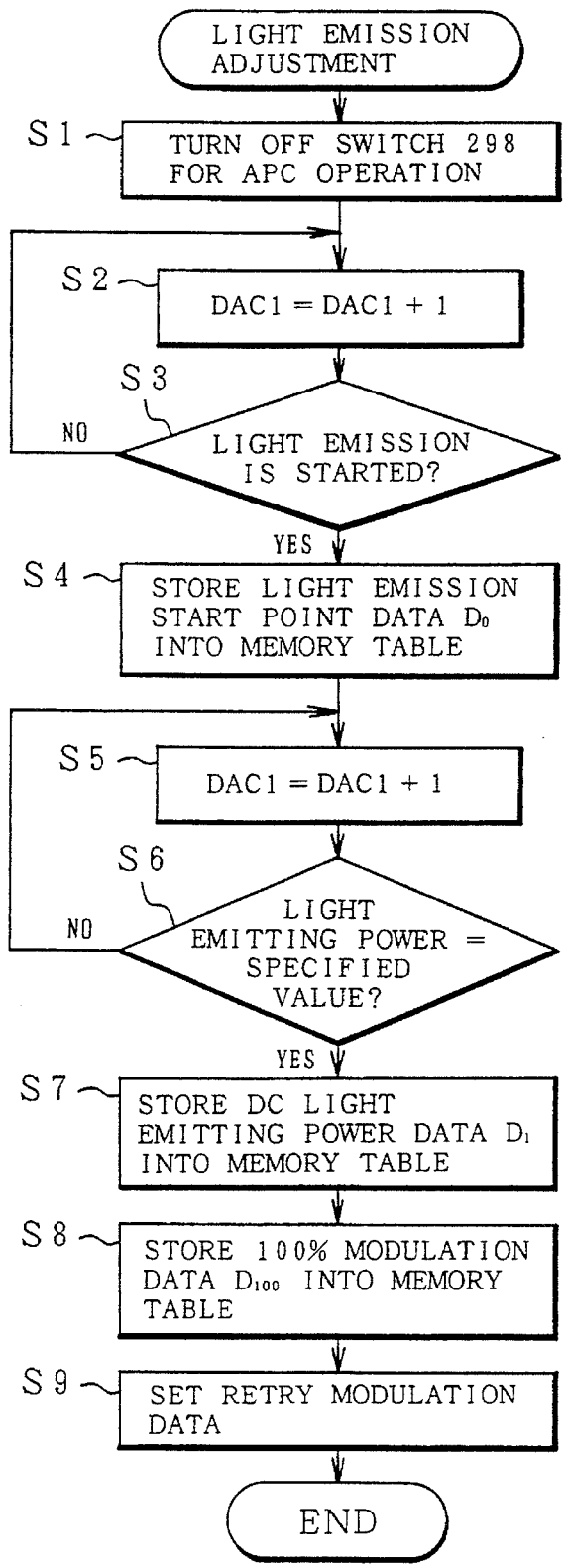
FIG. 21 is a flowchart for a light emission adjusting process in FIG. 20.

A flowchart in FIG. 21 shows the light emitting process in FIG. 20. When the power source of the apparatus is turned on, the light emission adjusting mode is set and the analog switch 298 is first tuned off in step S1, thereby stopping the function of the automatic light emission control circuit 300. Subsequently, in step S2, the MPU 12 sets the light emission data DAC1=0 into the D/A converter 302. Until the light emission start such that the light emission of the laser diode 170 is started because the detection data from the A/D converter 312 is equal to or larger than 0 is set in step S3, the light emission data DAC1 is increased by a predetermined step at a time in step S2. When the light emission start of the laser diode 170 is detected in step S3, the light emission data DAC1 at that time is stored into the memory table 902 as light emission start point data $D_0$. Subsequently, while the light emission data DAC1 of the D/A converter 302 is increased by a predetermined step at a time in step S5, the process to increase the light emission data is repeated until the light emitting power of the laser diode 170 reaches a predetermined specified value for reproduction, namely, what is called a DC light emission power value in step S6. When the specified DC light emission power value is obtained in step S6, step S7 follows and the DC light emission power data $D_1$ is stored into the memory table 902. Finally, in step S8, the 100% modulation data (amplitude data of 100% modulation) $D_{100}$ is obtained as data which is obtained by subtracting the light emission start point data $D_0$obtained in step S4 from the DC light emission power data $D_1$ obtained in step S7 and further by doubling the resultant data. The data $D_{100}$ is stored into the memory table 902. That is, the data $D_{100}$ is obtained by the following equation and stored into the memory table 902.

$$D_{100}=2\times(D_1-D_0)$$

Figure 22:
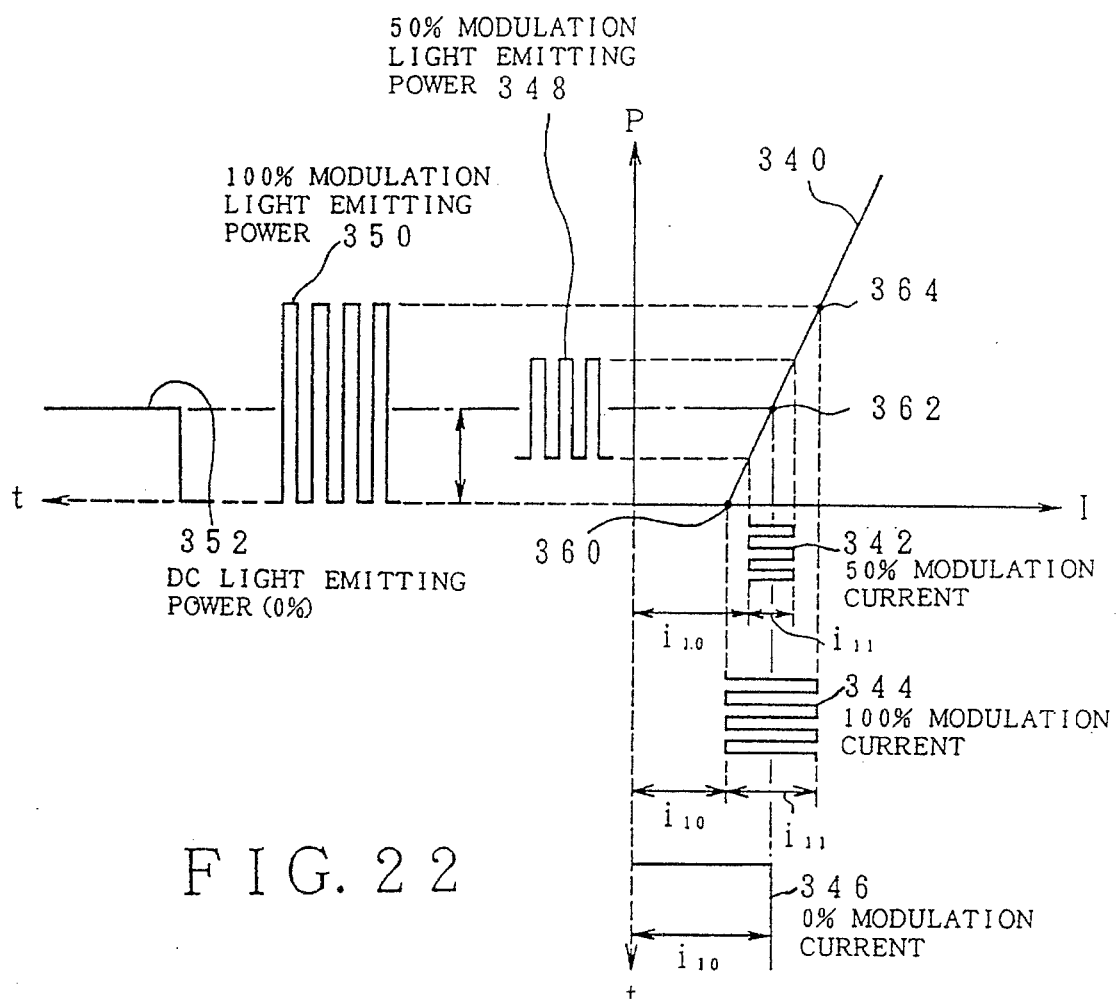
FIG. 22 is an explanatory diagram of driving characteristics of a laser diode.

FIG. 22 shows characteristics of a light emitting power (P) to a drive current (I) of the laser diode 170. In the light emission adjusting mode, light emission start point data $D_{10}$ of a light emission start point 360 is obtained by sequentially increasing the drive current (I) (I=$i_{10}$). By further increasing the drive current (I), the light emission power data $D_1$ by which the specified DC light emitting power which is given at an operation point 362 is obtained is derived. Therefore, in the case where a high frequency modulation is not needed in the normal light emission control, a DC light emitting power 352 of 0% modulation can be obtained by supplying a predetermined drive current 346 which is given at the operation point 362. Again referring to FIG. 21, retry modulation data is finally obtained in step S9. In the embodiment, for example, it is assumed that 0% modulation, 50% modulation, and 100% modulation are executed. FIG. 22 shows modulation currents 342, 344, 346 at the time of the 50% modulation, 100% modulation, and 0% modulation and those light emitting powers 348, 350, and 352. For instance, when considering the 100% modulation as an example, the 0% modulation current 346 at the operation point 362 at which the basic DC light emitting power 352 is obtained is set to the center and the 100% modulation current 344 having an amplitude of up to an operation point 364 which is twice as large as the amplitude in a range from the light emission start point 360 to the operation point 362 is supplied to the laser diode 170. In the 100% modulation current 344, the current serving as a basic DC component is set to the current $i_{10}$ which is supplied in the automatic light emission control circuit 300 and the current $i_{11}$ which flows due to the switching by the transistor 316 of the high frequency modulation circuit 314 is added to the current $i_{10}$. Namely, the current obtained by the following equation flows in the laser diode 170.

$$I = i_{10} + i_{11}$$

The above relation is expressed as follows by the DC light emission data DAC1 for the D/A converter 302 and modulation amount data DAC2 for the D/A converter 320.

$$I = i_{10} + i_{11} = DAC1 + DAC2$$

Since the modulation coefficient (K)=1.0, the modulation amount data DAC2 is as follows.

$$DAC2 = K \times D_{100} = 1.0 \times D_{100}$$

The DC light emission data DAC1 is obtained by the following equation.

$$DAC1 = D_1 - (K \times D_{100})/2 = D_1 - 0.5 D_{100}$$

With respect to the 50% modulation, in a manner similar to the above, since the modulation coefficient (K)=0.5, $$DAC2 = K \times D_{100} = 1.0 \times D_{100}$$

$$DAC1 = D_1 - (K \times D_{100})/2 = D_1 - 0.25 D_{100}$$

In this instance, since the data $D_1$ at the time of the 0% modulation has already been detected in step S7, by deciding the value of the modulation coefficient (K), the DC light emission data DAC1 and the modulation amount data DAC2 which are used for an arbitrary modulation amount can be obtained from the following relational equations.

$$DAC1 = D_1 - (K \times D_{100})/2 \qquad (1)$$

$$DAC2 = K \times D_{100} \qquad (2)$$

Figure 23:
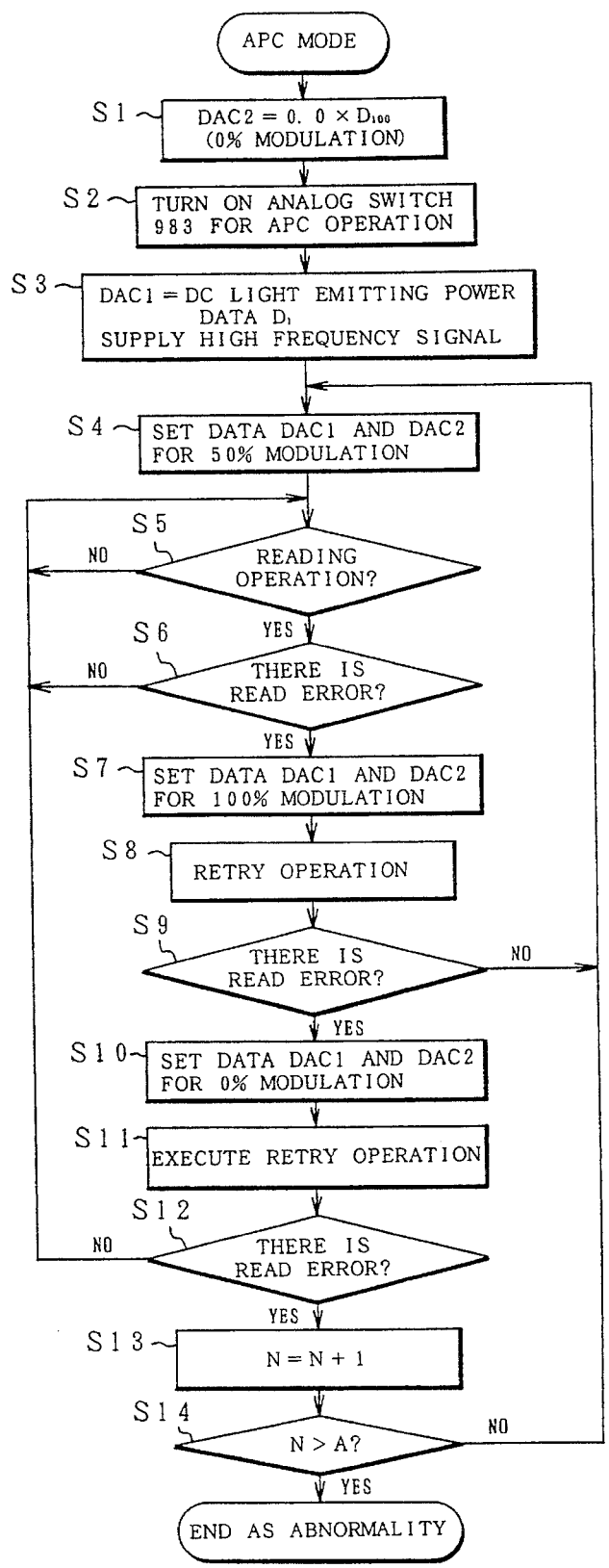
FIG. 23 is a flowchart of the processing operation of an automatic light emission control in FIG. 20.

A flowchart in FIG. 23 shows the automatic light emission control of FIG. 20. In step 1, the MPU 12 sets data which is obtained by multiplying the modulation amount data DAC2 for the D/A converter 320 to (DAC2=0) in the 0% modulation state, namely, by multiplying the coefficient (K)=0 to the 100% modulation data $D_{100}$. Therefore, the transistor 322 is held in the off state and the modulation current by the high frequency modulation circuit 314 is set to 0. In step S2, the analog switch 298 is turned on and the automatic light emission control circuit 300 is made operative. Subsequently, in step S3, the specified DC light emission power data $D_1$ is set to the D/A converter 302, thereby setting into the light emitting state of the DC light emitting power 352 by the DC light emission drive current 346 shown in FIG. 22. At the same time by supplying, the high frequency signals 332 and 334 to the transistors 316 and 318 of the high frequency modulation circuit 314, the switching operation is started. Since the transistor 322 is in the off state at that time, the modulation current $i_{11}$ doesn't flow and the apparatus is in the 0% modulation state. In step S4, for the D/A converter 320, the DC light emission data DAC1 obtained by the foregoing equations (1) and (2) by using the coefficient (K)=0.5 at the time of the 50% modulation is set to the D/A converter 302 and the modulation amount data DAC2 simultaneously is set to the D/A converter 320. Due to this, the automatic light emission control circuit 300 supplies the predetermined drive current $i_{10}$ to the laser diode 170 on the basis of the DC light emission data DAC1. The modulation current $i_{11}$ having an amplitudecorresponding to the modulation amount data DAC2 due to the switching by the transistor 316 of the high frequency modulation circuit 314 flows as a 50% modulation current 342 so as to be multiplexed to the drive current $i_{10}$, so that the 50% modulation light emitting power 348 is obtained. As mentioned above, in the ordinary state, the reading operation using the modulation light having a depth of the 50% modulation is performed by the laser diode 170.

Subsequently, a check is made in step S5 to see if the reading operation is executed or not. If the reading operation is executed, step S6 follows and a check is made to see if the presence or absence of a read error which cannot be corrected by the error correction code. If there is the read error, the processing routine advances to step S7 and the modulation amount is increased to the 100% modulation state in the embodiment. That is, for the D/A converter 320, the DC light emission data DAC1 obtained from the foregoing equations (1) and (2) using for example, the coefficient (K)=1.0 at the time of the 100% modulation is set to the D/A converter 302. Simultaneously, the modulation amount data DAC2 is set to the D/A converter 320. Due to this, the automatic light emission control circuit 300 supplies the predetermined drive current $i_{10}$ to the laser diode 170 on the basis of the DC light emission data DAC1. The modulation current $i_{11}$ having the amplitude corresponding to the modulation amount data DAC2 due to the switching by the transistor 316 of the high frequency modulation circuit 314 flows so as to be multiplexed to the current $i_{10}$. As a result, the 100% modulation current 344 flows in the laser diode 170 and the 100% modulation light emitting power 350 is obtained. Subsequently, in a state in which the modulation amount was increased to the 100% modulation state, the retry operation of the reading process is performed in step S8. If the back talk noises are reduced because of the increase in the modulation amount and the reading operation can be normally performed, the absence of the read error is judged in step S9, the processing routine is returned to step S4 again, the modulation amount is returned to the normal 50% modulation state, and the processing routine advances to the next reading process. In the case where there is a read error in step S9 even if the retry operation was executed in the 100% modulation state, step S10 follows and the modulation amount is contrarily reduced. In this case, the modulation amount is set to the 0% modulation state in which the DC light emission data DAC1 for the D/A converter 302 is set to the specified light emission data $D_1$ and the modulation amount data DAC2 for the D/A converter 320 is set to 0. The processing routine advances to step S11 in the 0% modulation state and the retry operation of the reading process is executed. If there is no read error in step S12, the processing routine is returned to step S5 in this case. Namely, while the modulation amount is reduced and held to the 0% modulation state, the subsequent reading process in step S5 is continued. This is because the lifetime of the laser diode 170 can be kept longer in the 0% modulation state in which no modulation is performed rather than the case in the 50% modulation state.

In the case where there is a read error in step S12 even if the retry operation was executed by reducing to the 0% modulation state, step S13 follows. In step S13, the count value of the retry counter (N) is increased by "1". In step S14, the processes in step S4 to S12, namely, the retry operation by the switching of the three-stage modulation amounts of the 50% modulation, 100% modulation, and 0% modulation is repeated until the count value of the retry counter (N) reaches the predetermined number (A) of retry times. In the case where the read error occurs even if the count value of the retry counter (N) exceeds the predetermined number (A) of retry times, it is determined that such an error is a hardware error with which the apparatus cannot cope by the change in the modulation amount. The processing routine is finished as abnormality.

In this instance, according to the retry operation to change the modulation amount in FIG. 23, the 50% modulation is set in the normal state, the modulation amount is increased to 100% when an error occurs, and further, the modulation amount is changed to 0% when an error occurs. It is also possible, however, to execute the retry operation in which the modulation amount is changed as follows as a method other than the above method.

I. 50% modulation is set in the normal state. The modulation amount is increased to 100% modulation when an error occurs.

II. 0% modulation is set in the normal state. The modulation amount is increased to a predetermined modulation amount when an error occurs.

III. A predetermined modulation amount is set in the normal state. The modulation amount is reduced when an error occurs.

In the above embodiments, although the modulation amount in the normal state has been set to 50%, the increased modulation amount at the time of error occurrence has been set to 100%, and the decreased modulation amount has been set to 0%. However, the values of those modulation amounts can be also properly determined as necessary. For example, the modulation amount is increased or decreased step by step on a predetermined value unit basis. Further, the modulation amount at the time of the occurrence of an error can be also increased to a modulation amount exceeding 100%. That is, for the 100% modulation current 344 shown in FIG. 22, a modulation current of an amplitude which is further lower than that at the light emission start point 360 and further exceeds the current at the operation point 364 at the time of the 100% modulation is supplied, thereby forming a depth of the modulation up to an inactive region of the laser diode 170.

According to the invention as mentioned above, in case of using the MCAV format, when the track address cannot be read in the seeking operation, the clock frequency of the corresponding zone is selected by physically detecting the track position by the head position sensor or the home position sensor and the retry operation is performed. Thus, the retry processing time can be reduced and the performance of the apparatus can be improved.

On the other hand, at the time of the retry operation in the case where a read error exceeding the correcting ability by the error correction code occurs, by changing the modulation amount of the read beam, the back talk noises can be reduced and the occurrence of errors can be suppressed. In the normal state, the reduction of the lifetime of the laser diode can be suppressed by executing no modulation or executing a slight modulation.

The present invention is not limited by the specific numerical values shown in the above embodiments. With respect to the high frequency modulation of the reproduced laser beam, the modulation is not limited to the MCAV format of the optical disk medium and can be also applied as it is to the case of the CAV format.

What is claimed is:

1. An optical disk apparatus using an optical disk medium having a plurality of circumferential tracks for reading data from/onto the medium, said plurality of tracks being divided into a plurality of zones in the radial direction, the data being read out or written by using clock signals having frequency components which are different in every zone, wherein said apparatus comprises:

optical head means for irradiating a light beam onto a selected track of said optical disk medium, thereby optically reading or writing the data;

servo means for moving said optical head means to selected positions and controlling the position of the light beam from said optical head means with respect to said optical disk medium; frequency setting means for generating frequency information;

clock generating means for generating a clock signal which is used for the reading/writing operations of the optical disk medium and for changing a component of the frequency of said clock signal by setting frequency information received from said frequency setting means;

access means for recognizing a track address of the selected track from a track passing signal which is obtained due to the movement of said optical head means and for moving the optical head means to a target track on the optical disk medium on the basis of a seeking command from a host;

said frequency setting means changing a frequency component of the clock signal of said clock generating means to a frequency component according to a zone of the target track;

head position detecting means for detecting the position of the said optical head means; and retry means for allowing the track address to be again read by using a clock signal of the zone frequency set for the track address which was determined from a detection signal of said head position detecting means when said access means fails to read the track address due to a defect.

2. An apparatus according to claim 1, wherein said frequency setting means comprises:

frequency information storing means in which predetermined clock frequency information which differs every said zone has been stored; and frequency selecting means for selecting clock frequency information of a corresponding zone in said frequency information storing means on the basis of address information of the present track in said access means and for setting the selected clock frequency information into said clock generating means.

3. An apparatus according to claim 1, wherein until the track address is read out, said retry means repeats the rereading operation in which the clock frequency of the zone which is obtained by changing the present detection zone one by one in an inner rim direction and the clock frequency of the zone which is obtained by changing the present detection zone one by one in an outer rim direction have been alternately set.

4. An apparatus according to claim 1, wherein said retry means further detects the track address of the target track from the read signal of said optical head means after completion of the seeking operation by said access means and finishes the seeking operation as a normality when said detected track address coincides with the present track address recognized by the access means.

5. An apparatus according to claim 4, wherein in the case where the occurrence of the defective reading operation of the track address is judged by a track address judging means after completion of the seeking operation by said access means, said retry means judges the zone from the detection signal of said head position detecting means and allows the track address to be again read by using the clock signal with the selected frequency component.

6. An apparatus according to claim 5, wherein until the track address is read out, said retry means repeats the rereading operation in which the clock frequency of the zone which is obtained by changing the present detection zone one by one in an inner rim direction and the clock frequency of the zone which is obtained by changing the present detection zone one by one in an outer rim direction have been alternately set.

7. An apparatus according to claim 1, wherein said retry means repeats the rereading operation using the same clock frequency component until the number of defective reading operations of the track address using the clock frequency component which was once selected reaches a predetermined number of times.

8. An optical disk apparatus using an optical disk medium having a plurality of circumferential tracks for reading or writing data from/onto the medium, said plurality of tracks being divided into a plurality of zones in the radial direction, the data being read out or written by using clock signals having frequency components which are different in every zone, wherein said apparatus comprises:

optical head means for irradiating a light beam onto a selected track of said optical disk medium, thereby optically reading or writing the data;

servo means for moving said optical head means to selected positions and controlling the position of the light beam from said optical head means with respect to said optical disk medium; frequency setting means for generating frequency information;

clock generating means for generating a clock signal which is used for the reading/writing operations of the optical disk medium and for changing a component of the frequency of said clock signal by setting frequency information received from said frequency setting means;

access means for recognizing a track address of the selected track from a track passing signal which is obtained due to the movement of said optical head means and for moving the optical head means to a target track on the optical disk medium on the basis of a seeking command from a host;

said frequency setting means changing a frequency component of the clock signal of said clock generating means to a frequency component according to a zone of the target track;

home position detecting means for detecting a predetermined, fixed home position with respect to said optical head means; and retry means for allowing the access means to move the optical head means to said home position in the case where the occurrence of a defective reading operation of the track address is judged by said access means and for allowing the rereading operation of the track address to be executed by using the clock signal of the zone frequency corresponding to the track address of the home position when a detection signal of said home position detecting means is obtained.

9. An apparatus according to claim 8, wherein said frequency setting means comprises:

frequency information storing means in which predetermined clock frequency information which differs every said zone has been stored; and frequency selecting means for selecting clock frequency information of a corresponding zone in said frequency information storing means on the basis of address information of the present track in said access means and for setting the selected clock frequency information into said clock generating means.

10. An apparatus according to claim 8, wherein said retry means further detects the track address of the target track from the read signal of said optical head means after completion of the seeking operation by said access means and finishes the seeking operation as a normality when said detected track address coincides with the present track address recognized by the access means.

11. An apparatus according to claim 10, wherein in the case where the occurrence of the defective reading operation of the track address is judged by a track address judging means after completion of the seeking operation by said access means, said retry means allows said access means to move said optical head means to said home position and for allowing the track address to be again read by using the clock signal of the zone frequency corresponding to the track address of the home position when a detection signal of said home position detecting means is obtained.

12. An apparatus according to claim 8 or 11, wherein said retry means repeats the rereading operation using the same clock frequency component until the number of defective reading operations of the track address using the clock frequency component which was once selected reaches a predetermined number of times.

13. An optical disk apparatus using an optical disk medium having a plurality of circumferential tracks for reading or writing data from/onto the medium, said plurality of tracks being divided into a plurality of zones in the radial direction, the data being read out or written by using clock signals having frequency components which are different in every zone, wherein said apparatus comprises:

an optical head for irradiating a light beam onto a selected track of said optical disk medium, thereby optically reading or writing the data;

a servo circuit section for moving said optical head to selected positions and controlling the position of the light beam from said optical head with respect to said optical disk medium;

a clock generating circuit for generating a clock signal which is used for the reading/writing operations of the optical disk medium and for changing a component of the frequency of said clock signal by setting frequency information received from a frequency setting circuit section;

a reading circuit section for recognizing a track address of the selected track from a track passing signal which is obtained due to the movement of said optical head and for moving the optical head to a target track on the optical disk medium on the basis of a seeking command from a host;

said frequency setting circuit section changing a frequency component of the clock signal of said clock generating circuit section to a frequency component according to the zone of a target track;

a head position sensor for detecting the position of said optical head means; and a retry circuit section for allowing the track address to be again read by using a clock signal of the zone frequency set for the track address which was determined from a detection signal of said head position sensor, when said reading circuit section fails to read the track address due to a defect.

14. An apparatus according to claim 13, wherein said frequency setting circuit section comprises:

a memory in which predetermined clock frequency information which differs every said zone has been stored; and a selecting circuit section for selecting clock frequency information of a corresponding zone in said memory on the basis of address information of the present track in said reading circuit section and for setting the selected clock frequency information into said clock generating circuit section.

15. An apparatus according to claim 13, wherein until the track address is read out, said retry circuit section repeats the rereading operation in which the clock frequency of the zone which is obtained by changing the present detection zone one by one in an inner rim direction and the clock frequency of the zone which is obtained by changing the present detection zone one by one in an outer rim direction have been alternately set.

16. An apparatus according to claim 13, wherein said retry circuit section further detects the track address of the target track from the read signal of said optical head after completion of the seeking operation by said reading circuit section and finishes the seeking operation as a normality when said detected track address coincides with the present track address recognized by the reading circuit section.

17. An apparatus according to claim 16, wherein in the case where the occurrence of the defective reading operation of the track address is judged after completion of the seeking operation by said reading circuit section, said retry circuit section judges the zone from the detection signal of said head position sensor and allows the track address to be again read by using the clock signal with the selected frequency component.

18. An apparatus according to claim 17, wherein until the track address is read out, said retry circuit section repeats the rereading operation in which the clock frequency of the zone which is obtained by changing the present detection zone one by one in an inner rim direction and the clock frequency of the zone which is obtained by changing the present detection zone one by one in an outer rim direction have been alternately set.

19. An optical disk apparatus using an optical disk medium having a plurality of circumferential tracks for reading or writing data from/onto the medium, said plurality of tracks being divided into a plurality of zones in the radial direction, the data being read out or written by using clock signals having frequency components which are different in every zone, wherein said apparatus comprises:

an optical head for irradiating a light beam onto a selected track of said optical disk medium, thereby optically reading or writing the data;

a servo circuit section for moving said optical head means to selected positions and controlling the position of the light beam from said optical head with respect to said optical disk medium;

a clock generating circuit section for generating a clock signal which is used for reading/writing operations of the optical disk medium and for changing a component of the frequency of said clock signal by setting frequency information received from a frequency setting circuit section;

a reading circuit section from recognizing a track address of the selected track from a track passing signal which is obtained due to the movement of said optical head and for moving the optical head to a target track on the optical disk medium on the basis of a seeking command from a host;

said frequency setting circuit section changing a frequency component of the clock signal of said clock generating circuit section to a frequency component according to a zone of a target track;

a home position sensor for detecting a predetermined, fixed home position with respect to said optical head; and a retry circuit section for allowing said reading circuit section to move the optical head to said home position in the case where the occurrence of a defective reading operation of the track address is judged by said reading circuit section and for allowing the rereading operation of the track address to be executed by using the clock signal of the zone frequency corresponding to the track address of the home position when a detection signal of said home position sensor is obtained.

20. An apparatus according to claim 19, wherein said frequency setting circuit section comprises:

a memory in which predetermined clock frequency information which differs every said zone has been stored; and a selecting circuit section for selecting clock frequency information of a corresponding zone in said memory on the basis of address information of the present track in said reading circuit section and for setting the selected clock frequency information into said clock generating circuit section.

21. An apparatus according to claim 19, wherein said retry circuit section further detects the track address of the target track from the read signal of said optical head after completion of the seeking operation by said reading circuit section and finishes the seeking operation as a normality when said detected track address coincides with the present track address recognized by the reading circuit section.

22. An apparatus according to claim 21, wherein in the case where the occurrence of the defective reading operation of the track address is judged by said reading circuit section after completion of the seeking operation, said retry circuit section allows said reading circuit section to move said optical head to said home position and for allowing the track address to be again read by using the clock signal of the zone frequency corresponding to the track address of the home position when a detection signal of said home position sensor is obtained.

* * * * *

UNITED STATES PATENT AND TRADEMARK OFFICE
CERTIFICATE OF CORRECTION

PATENT NO. : 5,495,458  
DATED : February 27, 1996  
INVENTOR(S) : Ikeda et al.

It is certified that error appears in the above-indentified patent and that said Letters Patent is hereby corrected as shown below:

On the Title Page, item [75]

In the section labeled inventors delete "Akira Minami".

Column 13, line 25, delete "iS" and insert --is--.

Column 13, line 41, delete "Generates" and insert --generates--.

Column 13, line 48, delete "Given" and insert --given--.

Column 15, line 55, delete "140," and insert --140.--.

Column 17, line 7, delete "rime" and insert --rim--.

Column 17, line 30, delete "rime" and insert --rim--.

Column 17, line 33, delete "rime" and insert --rim--.

UNITED STATES PATENT AND TRADEMARK OFFICE
CERTIFICATE OF CORRECTION

PATENT NO. : 5,495,458
DATED : February 27, 1996
INVENTOR(S) : Ikeda et al.

It is certified that error appears in the above-indentified patent and that said Letters Patent is hereby corrected as shown below:

Column 17, line 56, delete "rime" and insert --rim--.

Column 17, line 56, delete "rime" and insert --rim--.

Column 21, line 15, after "connected" insert --to--.

Column 24, line 18, delete "amplitudecorresponding" and insert --amplitude corresponding--.

Signed and Sealed this

Sixth Day of May, 1997

Attest:

BRUCE LEHMAN

Attesting Officer

Commissioner of Patents and Trademarks